(12) United States Patent
Parness et al.

(10) Patent No.: US 10,953,688 B2
(45) Date of Patent: Mar. 23, 2021

(54) SYSTEMS AND METHODS FOR IMPLEMENTING FLEXIBLE MEMBERS INCLUDING INTEGRATED TOOLS MADE FROM METALLIC GLASS-BASED MATERIALS

(71) Applicant: California Institute of Technology, Pasadena, CA (US)

(72) Inventors: Aaron Parness, Los Angeles, CA (US); Kalind C. Carpenter, Pasadena, CA (US); Douglas C. Hofmann, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 91 days.

(21) Appl. No.: 16/178,151

(22) Filed: Nov. 1, 2018

(65) Prior Publication Data
US 2019/0126674 A1    May 2, 2019

Related U.S. Application Data

(63) Continuation of application No. 15/069,381, filed on Mar. 14, 2016, now Pat. No. 10,155,412.

(60) Provisional application No. 62/132,325, filed on Mar. 12, 2015.

(51) Int. Cl.
*B60B 15/02* (2006.01)
*B60B 15/08* (2006.01)

(52) U.S. Cl.
CPC ............ *B60B 15/02* (2013.01); *B60B 15/021* (2013.01); *B60B 15/08* (2013.01)

(58) Field of Classification Search
CPC ........ B60B 15/02; B60B 15/021; B60B 15/08
See application file for complete search history.

(56) References Cited

U.S. PATENT DOCUMENTS

| | | | |
|---|---|---|---|
| 3,435,512 | A | 4/1969 | Macrobbie |
| 3,529,457 | A | 9/1970 | Bowers |
| 3,682,606 | A | 8/1972 | Anderson et al. |
| 3,986,412 | A | 10/1976 | Farley et al. |
| 4,123,737 | A | 10/1978 | Hoagland, Jr. |
| RE29,989 | E | 5/1979 | Polk |

(Continued)

FOREIGN PATENT DOCUMENTS

| | | |
|---|---|---|
| CN | 101709773 A | 5/2010 |
| CN | 102563006 A | 7/2012 |

(Continued)

OTHER PUBLICATIONS

Hofmann et al., "Designing metallic glass matrix composites with high toughness and tensile ductility", Nature Letters, Feb. 28, 2008, vol. 451, pp. 1085-1090.

(Continued)

*Primary Examiner* — John C Hong
(74) *Attorney, Agent, or Firm* — KPPB LLP

(57) ABSTRACT

Systems and methods in accordance with embodiments of the invention implement flexible members that include integrated tools made from metallic glass-based materials. In one embodiment, a structure includes: a flexible member characterized by an elongated geometry and an integrated tool disposed at one end of the elongated geometry; where the flexible member includes a metallic glass-based material.

15 Claims, 11 Drawing Sheets

(56) References Cited

U.S. PATENT DOCUMENTS

| | | | |
|---|---|---|---|
| 4,173,393 A | 11/1979 | Maurer | |
| 4,202,404 A | 5/1980 | Carlson | |
| 4,711,795 A | 12/1987 | Takeuchi et al. | |
| 4,749,625 A | 6/1988 | Obayashi et al. | |
| 4,810,314 A | 3/1989 | Henderson et al. | |
| 4,812,150 A | 3/1989 | Scott | |
| 4,823,638 A | 4/1989 | Ishikawa | |
| 4,851,296 A | 7/1989 | Tenhover et al. | |
| 4,883,632 A | 11/1989 | Goto et al. | |
| 4,935,291 A | 6/1990 | Gunnink | |
| 5,168,918 A | 12/1992 | Okuda et al. | |
| 5,288,344 A | 2/1994 | Peker et al. | |
| 5,310,432 A | 5/1994 | Yamanaka et al. | |
| 5,485,761 A | 1/1996 | Rouverol | |
| 5,509,978 A | 4/1996 | Masumoto et al. | |
| 5,636,550 A | 6/1997 | Deane | |
| 5,722,295 A | 3/1998 | Sakai et al. | |
| 5,746,844 A | 5/1998 | Sterett et al. | |
| 5,772,803 A | 6/1998 | Peker et al. | |
| 5,866,272 A | 2/1999 | Westre et al. | |
| 5,896,642 A | 4/1999 | Peker et al. | |
| 5,985,204 A | 11/1999 | Otsuka et al. | |
| 6,162,130 A | 12/2000 | Masumoto et al. | |
| 6,273,322 B1 | 8/2001 | Yamamoto et al. | |
| 6,620,264 B2 | 9/2003 | Kundig et al. | |
| 6,652,679 B1 | 11/2003 | Inoue et al. | |
| 6,771,490 B2 | 8/2004 | Peker et al. | |
| 6,843,496 B2 | 1/2005 | Peker et al. | |
| 6,887,586 B2 | 5/2005 | Peker et al. | |
| 7,052,561 B2 | 5/2006 | Lu et al. | |
| 7,073,560 B2 | 7/2006 | Kang et al. | |
| 7,075,209 B2 | 7/2006 | Howell et al. | |
| 7,357,731 B2 | 4/2008 | Johnson et al. | |
| 7,360,419 B2 | 4/2008 | French et al. | |
| 7,497,981 B2 | 3/2009 | Graham et al. | |
| 7,500,987 B2 | 3/2009 | Bassler et al. | |
| 7,552,664 B2 | 6/2009 | Bulatowicz | |
| 7,575,040 B2 | 8/2009 | Johnson | |
| 7,862,323 B2 | 1/2011 | Micarelli et al. | |
| 7,883,592 B2 | 2/2011 | Hofmann et al. | |
| 7,896,982 B2 | 3/2011 | Johnson et al. | |
| 7,955,713 B2 | 6/2011 | Roebroeks et al. | |
| 8,042,770 B2 | 10/2011 | Martin et al. | |
| 8,400,721 B2 | 3/2013 | Bertele et al. | |
| 8,418,366 B2 | 4/2013 | Wang et al. | |
| 8,485,245 B1 | 7/2013 | Prest et al. | |
| 8,496,077 B2 * | 7/2013 | Nesnas | B25J 5/007 180/7.5 |
| 8,596,106 B2 | 12/2013 | Tang et al. | |
| 8,613,815 B2 | 12/2013 | Johnson et al. | |
| 8,639,484 B2 | 1/2014 | Wei et al. | |
| 8,789,629 B2 | 7/2014 | Parness et al. | |
| 8,986,469 B2 | 3/2015 | Khalifa et al. | |
| 9,057,120 B2 | 6/2015 | Pham et al. | |
| 9,211,564 B2 | 12/2015 | Hofmann | |
| 9,328,813 B2 | 5/2016 | Hofmann et al. | |
| 9,610,650 B2 | 4/2017 | Hofmann et al. | |
| 9,783,877 B2 | 10/2017 | Hofmann et al. | |
| 9,791,032 B2 | 10/2017 | Hofmann et al. | |
| 9,868,150 B2 | 1/2018 | Hofmann et al. | |
| 9,996,053 B2 | 6/2018 | O'Keeffe et al. | |
| 10,081,136 B2 | 9/2018 | Hofmann et al. | |
| 10,151,377 B2 | 12/2018 | Hofmann et al. | |
| 10,155,412 B2 | 12/2018 | Parness et al. | |
| 10,174,780 B2 | 1/2019 | Hofmann et al. | |
| 10,487,934 B2 | 11/2019 | Kennett et al. | |
| 2002/0053375 A1 | 5/2002 | Hays et al. | |
| 2002/0100573 A1 | 8/2002 | Inoue et al. | |
| 2002/0184766 A1 | 12/2002 | Kobayashi et al. | |
| 2003/0052105 A1 | 3/2003 | Nagano et al. | |
| 2003/0062811 A1 | 4/2003 | Peker et al. | |
| 2004/0103536 A1 | 6/2004 | Kobayashi et al. | |
| 2004/0103537 A1 | 6/2004 | Kobayashi et al. | |
| 2004/0154701 A1 | 8/2004 | Lu et al. | |
| 2005/0034792 A1 | 2/2005 | Lu et al. | |
| 2005/0127139 A1 | 6/2005 | Slattery et al. | |
| 2005/0263932 A1 | 12/2005 | Heugel | |
| 2006/0105011 A1 | 5/2006 | Sun et al. | |
| 2006/0130944 A1 | 6/2006 | Poon et al. | |
| 2006/0156785 A1 | 7/2006 | Mankame et al. | |
| 2007/0034304 A1 | 2/2007 | Inoue et al. | |
| 2007/0226979 A1 | 10/2007 | Paton et al. | |
| 2007/0228592 A1 | 10/2007 | Dunn et al. | |
| 2007/0253856 A1 | 11/2007 | Vecchio et al. | |
| 2008/0085368 A1 | 4/2008 | Gauthier et al. | |
| 2008/0099175 A1 | 5/2008 | Chu et al. | |
| 2008/0121316 A1 | 5/2008 | Duan et al. | |
| 2009/0011846 A1 | 1/2009 | Scott | |
| 2009/0114317 A1 | 5/2009 | Collier et al. | |
| 2009/0194205 A1 | 8/2009 | Loffler et al. | |
| 2009/0288741 A1 | 11/2009 | Zhang et al. | |
| 2010/0313704 A1 | 12/2010 | Wang et al. | |
| 2011/0048587 A1 | 3/2011 | Vecchio et al. | |
| 2011/0154928 A1 | 6/2011 | Ishikawa | |
| 2011/0302783 A1 | 12/2011 | Nagata et al. | |
| 2012/0067100 A1 | 3/2012 | Stefansson et al. | |
| 2012/0073710 A1 | 3/2012 | Kim et al. | |
| 2012/0077052 A1 | 3/2012 | Demetriou et al. | |
| 2012/0133080 A1 | 5/2012 | Moussa et al. | |
| 2012/0289946 A1 | 11/2012 | Steger | |
| 2013/0009338 A1 | 1/2013 | Mayer | |
| 2013/0062134 A1 | 3/2013 | Parness et al. | |
| 2013/0068527 A1 * | 3/2013 | Parness | B25D 17/28 175/57 |
| 2013/0112321 A1 | 5/2013 | Poole et al. | |
| 2013/0133787 A1 | 5/2013 | Kim | |
| 2013/0139964 A1 | 6/2013 | Hofmann et al. | |
| 2013/0143060 A1 | 6/2013 | Jacobsen et al. | |
| 2013/0280547 A1 | 10/2013 | Brandt et al. | |
| 2013/0309121 A1 | 11/2013 | Prest et al. | |
| 2013/0333814 A1 | 12/2013 | Fleury et al. | |
| 2014/0004352 A1 | 1/2014 | McCrea et al. | |
| 2014/0020794 A1 | 1/2014 | Hofmann et al. | |
| 2014/0030948 A1 | 1/2014 | Kim et al. | |
| 2014/0045680 A1 | 2/2014 | Nakayama et al. | |
| 2014/0048969 A1 | 2/2014 | Swanson et al. | |
| 2014/0070445 A1 | 3/2014 | Mayer | |
| 2014/0083640 A1 | 3/2014 | Waniuk et al. | |
| 2014/0093674 A1 | 4/2014 | Hofmann et al. | |
| 2014/0141164 A1 | 5/2014 | Hofmann | |
| 2014/0202595 A1 | 7/2014 | Hofmann | |
| 2014/0203622 A1 * | 7/2014 | Yamamoto | B60K 17/043 301/6.5 |
| 2014/0213384 A1 | 7/2014 | Johnson et al. | |
| 2014/0224050 A1 | 8/2014 | Hofmann et al. | |
| 2014/0227125 A1 | 8/2014 | Hofmann | |
| 2014/0246809 A1 | 9/2014 | Hofmann | |
| 2014/0293384 A1 | 10/2014 | O'keeffe et al. | |
| 2014/0312098 A1 | 10/2014 | Hofmann et al. | |
| 2014/0342179 A1 | 11/2014 | Hofmann et al. | |
| 2014/0348571 A1 | 11/2014 | Prest et al. | |
| 2015/0014885 A1 | 1/2015 | Hofmann et al. | |
| 2015/0047463 A1 | 2/2015 | Hofmann et al. | |
| 2015/0068648 A1 | 3/2015 | Schroers et al. | |
| 2015/0075744 A1 | 3/2015 | Hofmann et al. | |
| 2015/0158067 A1 | 6/2015 | Kumar et al. | |
| 2015/0289605 A1 | 10/2015 | Prest et al. | |
| 2015/0298443 A1 | 10/2015 | Hundley et al. | |
| 2015/0314566 A1 | 11/2015 | Mattlin et al. | |
| 2015/0323053 A1 | 11/2015 | El-Wardany et al. | |
| 2016/0178047 A1 | 6/2016 | Kennett et al. | |
| 2016/0186850 A1 | 6/2016 | Hofmann et al. | |
| 2016/0258522 A1 | 9/2016 | Hofmann et al. | |
| 2016/0263937 A1 | 9/2016 | Parness et al. | |
| 2016/0265576 A1 | 9/2016 | Hofmann et al. | |
| 2016/0299183 A1 | 11/2016 | Lee | |
| 2016/0361897 A1 | 12/2016 | Hofmann et al. | |
| 2017/0121799 A1 | 5/2017 | Hofmann et al. | |
| 2017/0137955 A1 | 5/2017 | Hofmann et al. | |
| 2017/0226619 A1 | 8/2017 | Hofmann et al. | |
| 2018/0119259 A1 | 5/2018 | Hofmann et al. | |

(56) References Cited

U.S. PATENT DOCUMENTS

| | | | |
|---|---|---|---|
| 2018/0257141 | A1 | 9/2018 | Hofmann et al. |
| 2019/0154130 | A1 | 5/2019 | Hofmann et al. |

FOREIGN PATENT DOCUMENTS

| | | | |
|---|---|---|---|
| CN | 103153502 | A | 6/2013 |
| DE | 102010062089 | A1 | 5/2012 |
| EP | 0127366 | A1 | 5/1984 |
| EP | 1063312 | A1 | 12/2000 |
| EP | 1138798 | A1 | 10/2001 |
| EP | 1696153 | A1 | 8/2006 |
| EP | 1404884 | B1 | 7/2007 |
| EP | 1944138 | A2 | 7/2008 |
| JP | 61276762 | A | 12/1986 |
| JP | 09121094 | A | 5/1997 |
| JP | 2002045960 | A | 2/2002 |
| JP | 2004353053 | A | 12/2004 |
| JP | 2007040517 | A | 2/2007 |
| JP | 2007040518 | A | 2/2007 |
| JP | 2007247037 | A | 9/2007 |
| JP | 2008115932 | A | 5/2008 |
| JP | 2008264865 | A | 11/2008 |
| JP | 2011045931 | A | 3/2011 |
| JP | 2012046826 | A | 3/2012 |
| JP | 2012162805 | A | 8/2012 |
| JP | 2013057397 | A | 3/2013 |
| JP | 5249932 | B2 | 7/2013 |
| JP | 2013238278 | A | 11/2013 |
| KR | 101420176 | B1 | 7/2014 |
| WO | 2007038882 | A1 | 4/2007 |
| WO | 2008156889 | A2 | 12/2008 |
| WO | 2009069716 | A1 | 6/2009 |
| WO | 2011159596 | A1 | 12/2011 |
| WO | 2012031022 | A2 | 3/2012 |
| WO | 2012083922 | A1 | 6/2012 |
| WO | 2012147559 | A1 | 11/2012 |
| WO | 2013138710 | A1 | 9/2013 |
| WO | 2013141878 | A1 | 9/2013 |
| WO | 2013141882 | A1 | 9/2013 |
| WO | 2014004704 | A1 | 1/2014 |
| WO | 2014012113 | A2 | 1/2014 |
| WO | 2014058498 | A3 | 4/2014 |
| WO | 2015042437 | A1 | 3/2015 |
| WO | 2015156797 | A1 | 10/2015 |
| WO | 2018165662 | A1 | 9/2018 |

OTHER PUBLICATIONS

Hofmann et al., "Improving Ductility in Nanostructured Materials and Metallic Glasses:" Three Laws, Material Science Forum, vol. 633-634, 2010, pp. 657-663, published online Nov. 19, 2009.

Hofmann et al., "Semi-solid Induction Forging of Metallic Glass Matrix Composites", JOM, Dec. 2009, vol. 61, No. 12, pp. 11-17, plus cover.

Hong et al., "Microstructural characteristics of high-velocity oxygen-fuel (HVOF) sprayed nickel-based alloy coating", Journal of Alloys and Compounds, Jul. 26, 2013, vol. 581, pp. 398-403.

Hu et al., "Crystallization Kinetics of the $Cu_{47.5}Zr_{74.5}Al_5$ Bulk Metallic Glass under Continuous and Iso-thermal heating", App. Mech. and Materials, vols. 99-100, Sep. 8, 2011, p. 1052-1058.

Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97.

Huang et al., "Fretting wear behavior of bulk amorphous steel", Intermetallics, Jun. 12, 2011, vol. 19, pp. 1385-1389.

Inoue et al., "Cobalt-based bulk glassy alloy with ultrahigh strength and soft magnetic properties", Nature Materials, Sep. 21, 2003, vol. 2, pp. 661-663.

Inoue et al., "Development and applications of late transition metal bulk metallic glasses", Bulk Metallic Glasses, pp. 1-25, 2008.

Inoue et al., "Developments and applications of bulk metallic glasses", Reviews on Advanced Materials Science, Feb. 28, 2008, vol. 18, pp. 1-9.

Inoue et al., "Preparation of 16 mm diameter Rod of Amorphous $Zr_{65}Al_{7.5}Ni_{10}Cu_{17.5}$ Alloy", Material Transactions, JIM, 1993, vol. 34, No. 12, pp. 1234-1237.

Inoue et al., "Recent development and application products of bulk glassy alloys", Acta Materialia, Jan. 20, 2011, vol. 59, Issue 6, pp. 2243-2267.

Ishida et al., "Wear resistivity of super-precision microgear made of Ni-based metallic glass", Materials Science and Engineering, Mar. 25, 2007, vol. A449-451, pp. 149-154.

Jiang et al., "Low-Density High-Strength Bulk Metallic Glasses and Their Composites: A Review", Advanced Engineering Materials, Nov. 19, 2014, pp. 1-20, DOI: 10.1002/adem.201400252.

Jiang et al., "Tribological Studies of a Zr-Based Glass-Forming Alloy with Different States", Advanced Engineering Materials, Sep. 14, 2009, vol. 1, No. 11, pp. 925-931.

Johnson et al., "Quantifying the Origin of Metallic Glass Formation", Nature Communications, Jan. 20, 2016, vol. 7, 10313, 7 pgs. doi: 10.1038/ncomms10313.

Jung et al., "Fabrication of Fe-based bulk metallic glass by selective laser melting: A parameter study", Materials and Design, Jul. 30, 2015, vol. 86, pp. 703-708.

Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.

Kim, Junghwan et al. "Oxidation and crystallization mechanisms in plasma-sprayed Cu-based bulk metallic glass coatings", Acta Materialia., Feb. 1, 2010, vol. 58, pp. 952-962.

Kim et al., "Amorphous phase formation of Zr-based alloy coating by HVOF spraying process", Journal of Materials Science, Jan. 1, 2001, vol. 36, pp. 49-54.

Kim et al., "Design and synthesis of Cu-based metallic glass alloys with high glass forming ability", Journal of Metastable and Nanocrystalline Materials, Sep. 1, 2005, vols. 24-25, pp. 93-96.

Kim et al., "Enhancement of metallic glass properties of Cu-based BMG coating by shroud plasma spraying", Science Direct, Surface & Coatings Technology, Jan. 25, 2011, vol. 205, pp. 3020-3026, Nov. 6, 2010.

Kim et al., "Production of $Ni_{65}Cr_{15}P_{16}B_4$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9. pp. 1609-1613.

Kim et al., "Realization of high tensile ductility in a bulk metallic glass composite by the utilization of deformation-induced martensitic transformation", Scripta Materialia, May 3, 2011, vol. 65, pp. 304-307.

Kim et al., "Weldability of $Cu_{54}Zr_{22}Ti_{18}Ni_6$ bulk metallic glass by ultrasonic welding processing", Materials Letters, May 17, 2014, 130, pp. 160-163.

Kobayashi et al., "Fe-based metallic glass coatings produced by smart plasma spraying process", Materials Science and Engineering, Feb. 25, 2008, vol. B148, pp. 110-113.

Kobayashi et al., "Mechanical property of Fe-base metallic glass coating formed by gas tunnel type plasma spraying", ScienceDirect, Surface & Coatings Technology, Mar. 14, 2008, 6 pgs.

Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.

Kong et al., "Effect of Flash Temperature on Tribological Properties of Bulk Metallic Glasses", Tribol. Lett., Apr. 25, 2009, vol. 35, pp. 151-158.

Kozachkov et al., "Effect of cooling rate on the vol. fraction of B2 phases in a CuZrAlCo metallic glass matrix composite", Intermetallics, Apr. 19, 2013, vol. 39, pp. 89-93.

Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326.

Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.

(56) References Cited

OTHER PUBLICATIONS

Kumar et al., "Bulk Metallic Glass: The Smaller the Better", Advanced Materials, Jan. 25, 2011, vol. 23, pp. 461-476.

Kwon et al., "Wear behavior of Fe-based bulk metallic glass composites", Journal of Alloys and Compounds, Jul. 14, 2011, vol. 509S, pp. S105-S108.

Launey et al., "Fracture toughness and crack-resistance curve behavior in metallic glass-matrix composites", Applied Physics Letters, Jun. 18, 2009, vol. 94, pp. 241910-1-241910-3.

Launey et al., "Solution to the problem of the poor cyclic fatigue resistance of bulk metallic glasses", PNAS Early Edition, pp. 1-6, Jan. 22, 2009.

Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131.

Lee et al., "Nanomechanical properties of embedded dendrite phase and its influence on inelastic deformation of Zr55Al10Ni5Cu30 glassy alloy", Materials Science and Engineering A, Mar. 25, 2007, vol. 375, pp. 945-948.

Li et al., "Selective laser melting of Zr-based bulk metallic glasses: Processing, microstructure and mechanical properties", Materials and Design, Sep. 21, 2016, vol. 112, pp. 217-226.

Li et al., "Wear behavior of bulk $Zr_{41}Ti_{14}Cu_{12.5}Ni_{10}Be_{22.5}$ metallic glasses", J. Mater. Res., Aug. 2002, vol. 17, No. 8, pp. 1877-1880.

Lillo et al., "Microstructure, Processing, Performance Relationships for High Temperature Coatings", U.S. Department of Energy, Office of Fossil Energy, under DOE Idaho Operations Office, Contract DE-AC07-05ID14517; 22nd Annual Conference on Fossil Energy Materials, Pittsburgh, U.S., 8 pgs., Jul. 1, 2008.

Lin et al., "Designing a toxic-element-free Ti-based amorphous alloy with remarkable supercooled liquid region for biomedical application", Intermetallics, Jul. 9, 2014, vol. 55, pp. 22-27.

List, A. et al. "Impact Conditions for Cold Spraying of Hard Metallic Glasses", Journal of Thermal Spray Technology, Jun. 1, 2012, vol. 21, No. 3-4, pp. 531-540.

Liu, X. Q. "Microstructure and properties of Fe-based amorphous metallic coating produced by high velocity axial plasma spraying", Science Direct, Journal of Alloys and Compounds, Apr. 23, 2009, vol. 484, pp. 300-307.

Liu et al., "Influence of Heat Treatment on Microstructure and Sliding Wear of Thermally Sprayed Fe-Based Metallic Glass coatings", Tribol. Lett., Mar. 4, 2012, vol. 46, pp. 131-138.

Liu et al., "Metallic glass coating on metals plate by adjusted explosive welding technique", Applied Surface Science, Jul. 16, 2009, vol. 255, pp. 9343-9347.

Liu et al., "Sliding Tribological Characteristics of a Zr-based Bulk Metallic Glass Near the Glass Transition Temperature", Tribol. Lett., Jan. 29, 2009, vol. 33, pp. 205-210.

Liu et al., "Wear behavior of a Zr-based bulk metallic glass and its composites", Journal of Alloys and Compounds, May 5, 2010, vol. 503, pp. 138-144.

Lupo!, R. et al. "Deposition of metallic coatings on polymer surfaces using cold spray", Science Direct, Surface & Coatings Technology, Sep. 6, 2010, vol. 205, pp. 2167-2173.

Ma et al., "Wear resistance of Zr-based bulk metallic glass applied in bearing rollers", Materials Science and Engineering, May 4, 2004, vol. A386, pp. 326-330.

Maddala et al., "Effect of notch toughness and hardness on sliding wear of $Cu_{50}Hf_{41.5}A_{18.5}$ bulk metallic glass", Scripta Materialia, Jul. 6, 2011, vol. 65, pp. 630-633.

Extended European Search Report for European Application No. 14889035.3, Search completed Dec. 4, 2017, dated Dec. 13, 2017, 10 Pgs.

International Preliminary Report on Patentability for International Application PCT/US2013/047950, dated Dec. 31, 2014, dated Jan. 8, 2015, 7 Pgs.

International Preliminary Report on Patentability for International Application PCT/US2013/050614, dated Jan. 20, 2015, dated Jan. 29, 2015, 9 Pgs.

International Preliminary Report on Patentability for International Application PCT/US2014/033510, dated Oct. 12, 2016, dated Oct. 20, 2016, 9 Pgs.

International Preliminary Report on Patentability for International Application PCT/US2014/056615, dated Mar. 22, 2016, dated Mar. 31, 2016, 11 Pgs.

International Search Report and Written Opinion for International Application No. PCT/US2013/050614, Completed May 7, 2014, dated May 7, 2014, 12 pgs.

International Search Report and Written Opinion for International Application No. PCT/US2018/022020, Search completed Jul. 2, 2018, dated Jul. 3, 2018, 12 Pgs.

International Search Report and Written Opinion for International Application PCT/US2013/047950, completed Oct. 8, 2013, dated Oct. 10, 2013, 9 pgs.

International Search Report and Written Opinion for International Application PCT/US2014/033510, completed Jan. 8, 2015, dated Jan. 8, 2015, 11 Pgs.

International Search Report and Written Opinion for International Application PCT/US2014/056615, completed Dec. 29, 2014, dated Dec. 30, 2014, 13 Pgs.

"Corrosion of Titanium and Titanium Alloys", Total Materia., printed Feb. 16, 2016 from http://www.totalmateria.com/Article24.htm, published Sep. 2001, 4 pgs.

"Gear", Dictionary.com. Accessed Aug. 30, 2016.

"Group 4 element", Wkipedia. https://en.wikipedia.org/wiki/Group_4_element. Published Jun. 11, 2010. Accessed Aug. 24, 2016.

"Harmonic Drive AG", website, printed from http://harmoncdrive.aero/?idcat=471, Feb. 20, 2014, 2 pgs.

"Harmonic Drive Polymer GmbH", printed Feb. 20, 2014 from http://www.harmonicdrive.de/English/the-company/subsidiaries/harmonic-drive-polymer-gmbh.html, 1 pg.

Mahbooba et al., "Additive manufacturing of an iron-based bulk metallic glass larger than the critical casting thickness", Applied Materials Today, Feb. 27, 2018, vol. 11, pp. 264-269.

Narayan et al., "On the hardness and elastic modulus of bulk metallic glass matrix composites", Scripta Materialia, Jun. 9, 2010, vol. 63, Issue 7, pp. 768-771.

Ni et al., "High performance amorphous steel coating prepared by HVOF thermal spraying", Journal of Alloys and Compounds, Jan. 7, 2009, vol. 467, pp. 163-167, Nov. 29, 2007.

Nishiyama et al., "Recent progress of bulk metallic glasses for strain-sensing devices", Materials Science and Engineering: A, Mar. 25, 2007, vols. 449-451, pp. 79-83.

Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286.

Parlar et al., "Sliding tribological characteristics of Zr-based bulk metallic glass", Intermetallics, Jan. 2008, vol. 16, pp. 34-41.

Pauly et al., "Modeling deformation behavior of Cu—Zr—Al bulk metallic glass matrix composites", Applied Physics Letters, Sep. 2009, vol. 95, pp. 101906-1-101906-3.

Pauly et al., "Processing Metallic Glasses by Selective Laser Melting", Materials Today, Jan./Feb. 2013, vol. 16, pp. 37-41.

Pauly et al., "Transformation-mediated ductility in CuZr-based bulk metallic glasses", Nature Materials, May 16, 2010, vol. 9, Issue 6, pp. 473-477.

Ponnambalam et al., "Fe-based bulk metallic glasses with diameter thickness larger than one centimeter", J Mater Res, Feb. 17, 2004. vol. 19; pp. 1320-1323.

Porter et al., "Incorporation of Amorphous Metals into MEMS for High Performance and Reliability", Rockwell Scientific Company, Final Report, Nov. 1, 2003, 41 pgs.

Prakash et al., "Sliding wear behavior of some Fe-, Co-and Ni-based metallic glasses during rubbing against bearing steel", Tribology Letters, May 1, 2000, vol. 8, pp. 153-160.

Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756.

(56) References Cited

OTHER PUBLICATIONS

Ramamurty et al., "Hardness and plastic deformation in a bulk metallic glass", Acta Materialia, Feb. 2005, vol. 53, pp. 705-717.
Revesz et al., "Microstructure and morphology of Cu—Zr—Ti coatings produced by thermal spray and treated by surface mechanical attrition", ScienceDirect, Journal of Alloys and Compounds, Jul. 14, 2011, vol. 509S, pp. S482-S485, Nov. 4, 2010.
Rigney et al., "The Evolution of Tribomaterial During Sliding: A Brief Introduction", Tribol. Lett, Jul. 1, 2010, vol. 39, pp. 3-7.
Roberts et al., "Cryogenic Charpy impact testing of metallic glass matrix composites", Scripta Materialia, Nov. 11, 2011, 4 pgs.
Sanders et al., "Stability of Al-rich glasses in the Al—La—Ni system", 2006, Intermetallics, 14, pp. 348-351.
Schuh et al., "A survey of instrumented indentation studies on metallic glasses", J. Mater. Res., Jan. 2004, vol. 19, No. 1, pp. 46-57.
Segu et al., "Dry Sliding Tribological Properties of Fe-Based Bulk Metallic Glass", Tribol. Lett., Apr. 28, 2012, vol. 47, pp. 131-138.
Shen et al., "3D printing of large, complex metallic glass structures", Materials and Design, Mar. 2017, vol. 117, pp. 213-222.
Shen et al., "Exceptionally high glass-forming ability of an FeCoCrMoCBY alloy", Applied Physics, Apr. 5, 2005, vol. 86, pp. 151907-1-151907-3.
Singer et al., "Wear behavior of triode-sputtered MoS2 coatings in dry sliding contact with steel and ceramics", Wear, Jul. 1996, vol. 195, Issues 1-2, pp. 7-20.
Sinmazcelik et al., "A review: Fibre metal laminates, background, bonding types and applied test methods", Materials and Design, vol. 32, Issue 7, 3671, Mar. 4, 2011, pp. 3671-3685.
Song et al., "Strategy for pinpointing the formation of B2 CuZr in metastable CuZr-based shape memory alloys", Acta Materialia, Aug. 6, 2011, vol. 59, pp. 6620-6630.
Sun et al., "Fiber metallic glass laminates", Dec. 2010, J. Mater. Res., vol. 25, No. 12, pp. 2287-2291.
Sundaram et al., "Mesoscale Folding, Instability, and Disruption of Laminar Flow in Metal Surfaces", Physical Review Letters, Sep. 7, 2012, vol. 109, pp. 106001-1-106001-5.
Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.
Tam et al., "Abrasion resistance of Cu based bulk metallic glasses", Journal of Non-Crystalline Solids, Oct. 18, 2004, vol. 347, pp. 268-272.
Tam et al., "Abrasive wear of $Cu_{60}Zr_{30}Ti_{10}$ bulk metallic glass", Materials Science and Engineering, Apr. 1, 2004, vol. A384 pp. 138-142.
Tan et al., "Synthesis of La-based in-situ bulk metallic glass matrix composite", Intermetallics, Nov. 2002, vol. 10, Issues 11-12, pp. 1203-1205.
Tao et al., "Effect of rotational sliding velocity on surface friction and wear behavior in Zr-based bulk metallic glass", Journal of Alloys and Compounds, Mar. 4, 2010, vol. 492, pp. L36-L39.
Tao et al., "Influence of isothermal annealing on the micro-hardness and friction property in CuZrAl bulk metallic glass", Advanced Materials Research, Jan. 1, 2011, vols. 146-147, pp. 615-618.
Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.
Wagner, "Mechanical Behavior of 18 Ni 200 Grade Maraging Steel at Cyrogenic Temperatures", J Aircraft, Nov. 1, 1986, vol. 23, No. 10, pp. 744-749.
Wang et al., "Progress in studying the fatigue behavior of Zr-based bulk-metallic glasses and their composites", Intermetallics, Mar. 6, 2009, vol. 17, pp. 579-590.
Whang et al., "Microstructures and age hardening of rapidly quenched Ti—Zr—Si alloys", Journal of Materials Science Letters,1985, vol. 4, pp. 883-887.
Wikipedia, "Harmonic Drive", printed Feb. 20, 2014, 4 pgs.

Wu et al., "Bulk Metallic Glass Composites with Transformation-Mediated Work-Hardening and Ductility", Adv. Mater., Apr. 26, 2010, vol. 22, pp. 2770-2773.
Wu et al., "Dry Sliding tribological behavior of Zr-based bulk metallic glass", Transactions of Nonferrous Metals Society of China, Jan. 16, 2012, vol. 22, Issue 3, pp. 585-589.
Wu et al., "Effects of environment on the sliding tribological behaviors of Zr-based bulk metallic glass", Intermetallics, Jan. 27, 2012, vol. 25, 115-125.
Wu et al., "Formation of Cu—Zr—Al bulk metallic glass composites with improved tensile properties", Acta Materialia 59, Feb. 19, 2011, pp. 2928-2936.
Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.
Yin, Enhuai et al. "Microstructure and mechanical properties of a spray-formed Ti-based metallic glass former alloy", Journal of Alloys and Compounds, Jan. 25, 2012, vol. 512, pp. 241-245.
Zachrisson et al., "Effect of Processing on Charpy impact toughness of metallic glass matrix composites", Journal of Materials Research, May 28, 2011, vol. 26, No. 10, pp. 1260-1268.
Zhang et al., "Abrasive and corrosive behaviors of Cu—Zr—Al—Ag—Nb bulk metallic glasses", Journal of Physics: Conference Series, 2009, vol. 144, pp. 1-4.
Zhang et al., "Robust hydrophobic Fe-based amorphous coating by thermal spraying", Appl. Phys. Lett., Sep. 20, 2012, vol. 101, pp. 121603-1-121603-4.
Zhang et al., "Wear behavior of a series of Zr-based bulk metallic glasses", Materials Science and Engineering, Feb. 25, 2008, vol. A475, pp. 124-127.
Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. u-2, pp. 344-350, Aug. 17, 2010.
Zhu et al., "Ta-particulate reinforced Zr-based bulk metallic glass matrix composite with tensile plasticity", Scripta Materialia, Mar. 2010, vol. 62, Issue 5, pp. 278-281.
Zhuo et al., "Spray formed Al-based amorphous matrix nanocomposite plate", ScienceDirect, Journal of Alloys and Compounds, Mar. 1, 2011, vol. 509, pp. L169-L173.
"Introduction to Thermal Spray Processing", ASM International, Handbook of Thermal Spray Technology (#06994G), 2004, 12 pgs.
Abdeljawad et al., "Continuum Modeling of Bulk Metallic Glasses and Composites", Physical Review Letters, vol. 105, 205503, Sep. 17, 2010, pp. 125503-1-125503-4.
Abrosimova et al., "Crystalline layer on the surface of Zr-based bulk metallic glasses", Journal of Non-Crystalline solids, Mar. 6, 2001, vol. 288, pp. 121-126.
An et al., "Synthesis of single-component metallic glasses by thermal spray of nanodroplets on amorphous substrates", Applied Physics Letters, Jan. 26, 2012, vol. 100, pp. 041909-1-041909-4.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326.
Bakkal, "Sliding tribological characteristics of Zr-based bulk metallic glass under lubricated conditions", Intermetallics, Mar. 19, 2010, vol. 18, pp. 1251-1253.
Bardt et al., "Micromolding three-dimensional amorphous metal structures", J. Mater. Res., Feb. 2007, vol. 22, No. 2, pp. 339-343.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631.
Boopathy et al., "Near-threshold fatigue crack growth in bulk metallic glass composites", J. Mater. Res., vol. 24, No. 12, pp. 3611-3619, Dec. 2009.
Bordeenithikasem et al., "Glass forming ability, flexural strength, and wear properties of additively manufactured Zr-based bulk metallic glasses produced through laser powder bed fusion", Additive Manufacturing, Mar. 21, 2018, vol. 21, pp. 312-317.

(56) References Cited

OTHER PUBLICATIONS

Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs., Oct. 1, 2001.

Cadney et al., "Cold gas dynamic spraying as a method for freeforming and joining materials", Science Direct, Surface & Coatings Technology, Mar. 15, 2008, vol. 202, pp. 2801-2806.

Calin et al., "Improved mechanical behavior of Cu—Ti-based bulk metallic glass by in situ formation of nanoscale precipitates", Scripta Materialia, Mar. 17, 2003, vol. 48, pp. 653-658.

Chen et al., "Elastic Constants, Hardness and Their Implications to Flow Properties of Metallic Glasses", Journal of Non-crystalline Solids, Sep. 1, 1975, vol. 18, pp. 157-171.

Chen et al., "Formation of Micro-Scale Precision Flexures Via Molding of Metallic Glass", Proceeding of the Annual Meeting of the ASPE, Monterey, CA, 2006, pp. 283-286.

Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652.

Cheng, J. B. "Characterization of mechanical properties of FeCrBSiMnNbY metallic glass coatings", J Mater Sci., Apr. 16, 2009, vol. 44, pp. 3356-3363.

Cheng et al., "Correlation of the microstructure and mechanical properties of Zr-based in-situ bulk metallic glass matrix composites", Intermetallics, Sep. 24, 2010, vol. 18, Issue 12, pp. 2425-2430.

Choi et al., "Tribological behavior of the kinetic sprayed $Ni_{59}Ti_{16}Zr_{20}Si_2Sn_3$", Journal of Alloys and Compounds, May 31, 2007, vol. 434-435, pp. 64-67.

Conner et al., "Shear band spacing under bending of Zr-based metallic glass plates", Acta Materialia, Jan. 27, 2004, vol. 52, pp. 2429-2434.

Conner et al., "Shear bands and cracking of metallic glass plates in bending", Journal of Applied Physics, Jul. 15, 2003, vol. 94, No. 2, pp. 904-911.

Dai et al., "A new centimeter-diameter Cu-based bulk metallic glass", Scripta Materialia, Jan. 20, 2006, vol. 54, pp. 1403-1408.

Dai et al., "High-performance bulk Ti—Cu—Ni—Sn—Ta nanocomposites based on a dendrite-eutectic microstructure", Journal of Materials Research, Sep. 2004, vol. 19, No. 9, pp. 2557-2566.

Davis, "Hardness/Strength Ratio of Metallic Glasses", Scripta Metallurgica, Feb. 18, 1975, vol. 9, pp. 431-436.

De Beer et al., "Surface Folds Make Tears and Chips", Physics, Sep. 4, 2012, vol. 100, 3 pgs.

Demetriou et al., "Glassy steel optimized for glass-forming ability and toughness", Applied Physics Letters, Jul. 31, 2009, vol. 95; pp. 041907-1-041907-3; http:/idx.doi.org/10.1063/1.3184792.

Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.

Duan et al., "Lightweight Ti-based bulk metallic glasses excluding late transition metals", Scripta Materialia, Mar. 2008, vol. 58, pp. 465-468.

Duan et al., "Tribological properties of $Zr_{41.25}Ti_{13.75}Ni_{10}Cu_{12.5}Be_{22.5}$ bulk metallic glasses under different conditions", Journal of Alloys and Compounds, Mar. 2, 2012, vol. 528, pp. 74-78.

Fan et al., "Metallic glass matrix composite with precipitated ductile reinforcement", Applied Physics Letters, Aug. 5, 2002, vol. 81, Issue 6, pp. 1020-1022.

Fleury et al., "Tribological properties of bulk metallic glasses", Materials Science and Engineering, Jul. 2004, vol. A375-377, pp. 276-279.

Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, May 27, 2011, vol. 4, pp. 1709-1717.

Fu et al., "Sliding behavior of metallic glass Part I. Experimental investigations", Wear, Oct. 2001, vol. 250, pp. 409-419.

Ganesan et al., "Bonding behavior studies of cold sprayed copper coating on the PVC polymer substrate", Surface & Coatings Technology, Jul. 10, 2012, vol. 207, pp. 262-269.

Garrett et al., "Effect of microalloying on the toughness of metallic glasses", Applied Physics Letter, Dec. 12, 2012, vol. 101, 241913-1-241913-3.

Gleason Corporation, "Gear Product News", Introducing genesis, The Next Generation in Gear Technology, Apr. 2006, 52 pgs.

Gloriant, "Microhardness and abrasive wear resistance of metallic glasses and nanostructured composite materials", Journal of Non-Crystalline Solids, Feb. 2003, vol. 316, pp. 96-103.

Greer, "Partially or fully devitrified alloys for mechanical properties", Materials and Science and Engineering, May 31, 2001, vol. A304, pp. 68-72.

Greer et al., "Wear resistance of amorphous alloys and related materials", International Materials Reviews, Apr. 1, 2002, vol. 47, No. 2, pp. 87-112.

Guo et al., "Tensile ductility and necking of metallic glass", Nature Materials, Oct. 2007, vol. 6, pp. 735-739.

Ha et al., "Tensile deformation behavior of two Ti-based amorphous matrix composites containing ductile β dendrites", Materials Science and Engineering: A, May 28, 2012, vol. 552, pp. 404-409.

Hale, "Principles and Techniques for Designing Precision Machines", Ph.D. Thesis, Feb. 1999, 493 pgs.

Harmon et al., "Anelastic to Plastic Transition in Metallic Glass-Forming Liquids", Physical Review Letters, Sep. 28, 2007, vol. 99, 135502-1-135502-4.

Haruyama et al., "Volume and enthalpy relaxation in $Zr_{55}Cu_{30}Ni_5Al_{10}$ bulk metallic glass", Acta Materialia, Mar. 2010, vol. 59, pp. 1829-1836.

Hays, C. C. "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.

He et al., "Novel Ti-base nanostructure—dendrite composite with enhanced plasticity", Nature Materials, Jan. 2003, Published Dec. 8, 2002, vol. 2, pp. 33-37, doi: 10.1038/nmat792.

Hejwowski et al., "A comparative study of electrochemical properties of metallic glasses and weld overlay coatings", Vacuum, Feb. 2013, vol. 88, pp. 118-123, Feb. 20, 2012.

Hofmann, "Bulk Metallic Glasses and Their Composites: A Brief History of Diverging Fields", Journal of Materials, Jan. 2013, vol. 2013, 7 pgs.

Hofmann, "Shape Memory Bulk Metallic Glass Composites", Science, Sep. 10, 2010, vol. 329, pp. 1294-1295.

Hofmann, D. C. "Development of tough, low-density titanium-based bulk metallic glass matrix composites with tensile ductility", PNAS, Dec. 23, 2008, vol. 105, pp. 20136-20140.

* cited by examiner

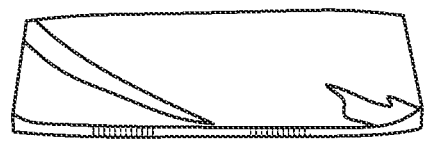
FIG. 2A          FIG. 2B
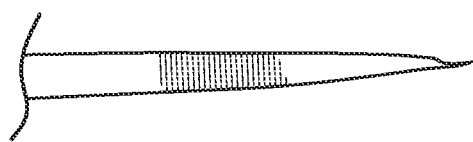
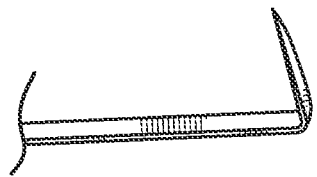
FIG. 2C          FIG. 2D
FIG. 2E United States Patent

SYSTEMS AND METHODS FOR IMPLEMENTING FLEXIBLE MEMBERS INCLUDING INTEGRATED TOOLS MADE FROM METALLIC GLASS-BASED MATERIALS

CROSS-REFERENCE TO RELATED APPLICATIONS

The current application is a continuation of U.S. application Ser. No. 15/069,381, filed Mar. 14, 2016, which application claims priority to U.S. Provisional Application No. 62/132,325, filed Mar. 12, 2015, the disclosures of which are incorporated herein by reference in their entireties.

STATEMENT OF FEDERAL FUNDING

The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention generally relates to the implementation of flexible members including integrated tools made from metallic glass-based materials.

BACKGROUND

Engineered mechanisms often rely on a variety of components characterized by intentionally distinct geometries and/or mechanical properties. Thus, for instance, U.S. Pat. No. 8,789,629 (the '629 patent) discloses terrain traversing devices having wheels with included microhooks. More specifically, the abstract of the '629 patent reads:

A terrain traversing device includes an annular rotor element with a plurality of co-planar microspine hooks arranged on the periphery of the annular rotor element. Each microspine hook has an independently flexible suspension configuration that permits the microspine hook to initially engage an irregularity in a terrain surface at a preset initial engagement angle and subsequently engage the irregularity with a continuously varying engagement angle when the annular rotor element is rotated for urging the terrain traversing device to traverse a terrain surface.

The '629 patent proposes that the referenced microspine wheel assembly can be made out of any of a variety of suitable materials including, for example steel and/or a hard plastic. The disclosure of the '629 patent is hereby incorporated by reference in its entirety.

SUMMARY OF THE INVENTION

Systems and methods in accordance with embodiments of the invention implement flexible members that include integrated tools made from metallic glass-based materials. In one embodiment, a structure includes: a flexible member characterized by an elongated geometry and an integrated tool disposed at one end of the elongated geometry; where the flexible member includes a metallic glass-based material.

In another embodiment, the integrated tool is a hook.

In yet another embodiment, the metallic glass-based material is a metallic glass matrix composite material.

In still another embodiment, the metallic glass-based material is characterized by a fracture toughness of greater than approximately 80 MPa·m$^{1/2}$.

In still yet another embodiment, flexible member is characterized in that it is fully amorphous.

In a further embodiment, the metallic glass-based material is characterized in that it has an elastic limit of greater than approximately 1%.

In a still further embodiment, the metallic glass-based material is characterized in that it has an elastic limit of greater than approximately 1.5%.

In a yet further embodiment, the metallic glass-based material is characterized in that it has an elastic limit of greater than approximately 2%.

In a still yet further embodiment, the flexible member is characterized by a thickness of less than approximately three times the size of the plastic zone radius of the metallic glass-based material.

In another embodiment, the flexible member is characterized by a thickness of less than approximately 1.5 mm.

In yet another embodiment, the flexible member defines a plurality of extensions including a plurality of integrated tools disposed at one end of respective extensions.

In still another embodiment, a wheel assembly includes: at least one rotor element; a plurality of flexible members, each characterized by an elongated geometry and an integrated tool at the end of the elongated geometry; where: at least one of the plurality of flexible members includes a metallic glass-based material; and the plurality of flexible members are approximately uniformly distributed around at least one rotor element such that the aggregate of the at least one rotor element and the plurality of flexible members can viably function as a wheel.

In still yet another embodiment, the integrated tool is a hook.

In a further embodiment, the metallic glass-based material of at least one flexible member is characterized by a fracture toughness of greater than approximately 80 MPa·m$^{1/2}$.

In a yet further embodiment, a method of forming a flexible member including an integrated tool, includes: forming a metallic glass-based material into an elongated geometry; and deforming the elongated geometry to define a tool at one end of the elongated geometry when the temperature of the metallic glass-based material is lower than its respective glass transition temperature; where the metallic glass-based material is characterized by a fracture toughness of greater than approximately 80 MPa·m$^{1/2}$.

In a still further embodiment, the integrated tool is a hook.

In a still yet further embodiment, the hook is defined by an angle of greater than approximately 80° relative to the remainder of the flexible member.

In another embodiment, forming the metallic glass-based material into an elongated geometry includes shearing an elongated geometry from a sheet of the metallic glass-based material.

In still another embodiment, the thickness of the elongated geometry is less than approximately three times the size of the plastic zone radius of the metallic glass-based material.

In yet another embodiment, the thickness of the elongated geometry is less than approximately 1.5 mm.

BRIEF DESCRIPTION OF THE DRAWINGS

FIGS. 2A-2E schematically illustrate constructing a flexible member including an integrated tool disposed at one end of the flexible member from a metallic glass-based material in accordance with certain embodiments of the invention.

DETAILED DESCRIPTION

Turning now to the drawings, systems and methods for implementing flexible members that include integrated tools made from metallic glass-based materials are illustrated. In many embodiments of the invention, the flexible members are elongated and include tools disposed at one end of its elongated geometry. In many embodiments, the integrated tool is a hook. In a number of embodiments, flexible members that include integrated hooks are disposed around the periphery of an annular rotor element. In numerous embodiments, either one or a plurality of such annular rotor elements are configured to operate as a wheel assembly.

Figure 1A:
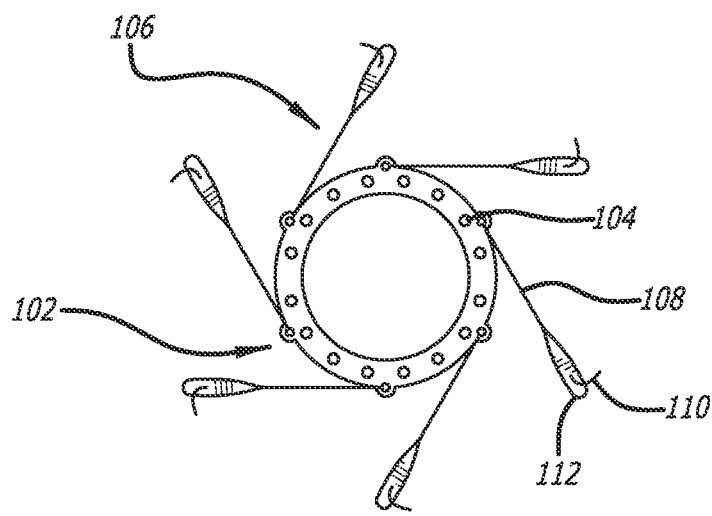
FIGS. 1A-1B illustrate a conventional wheel assembly that can be implemented within a terrain traversing devices.
Figure 1B:
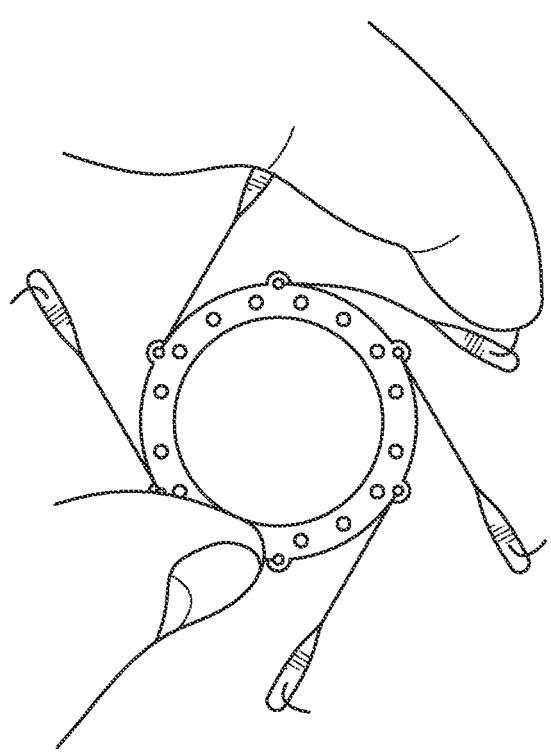

For context, FIGS. 1A-1B illustrate a conventional wheel assembly in accordance with the disclosure of the '629 patent. In particular, FIG. 1A illustrates a wheel assembly 102 that includes an annular rotor element 104 with attached flexible member/microspine hook assemblies 106, which themselves each include a flexible member 108 and an attached microspine hook 110. It is depicted that the microspine hooks 110 are attached to the flexible members 108 via a polymer 112. The flexible member/microspine hook assemblies 106 are distributed around the periphery of the annular rotor element 104. The flexible members 108 conventionally have been made from a flexible metal, such as spring steel or nitinol. The microspine hooks have conventionally been implemented via standard steel fishing hooks. FIG. 1B illustrates the flexibility of the flexible suspensions 108. As disclosed in the '629 patent, the depicted wheel assembly can be incorporated in a terrain traversing device, such that the wheels can operate to facilitate the traversal of rigorous terrain. In particular, the respective flexible suspensions permit respective microspine hooks to initially engage an irregularity in a terrain surface at a preset initial engagement angle when the annular rotor element is rotated for urging the terrain traversing device to traverse a terrain surface.

Although configurations such as those depicted in FIGS. 1A-1B manufactured from combinations of steel, nitinol, and/or polymer can be effective, there exists room for improvement. For example, the bonding of a distinct hook to a typical metallic flexible member using a polymer can define a weakness within the assembly. In particular, the polymer/microspine hook bonding can be susceptible to failure in these configurations. Such assemblies can benefit from a unibody construction, and more particularly from the incorporation of metallic glass-based materials.

Metallic glasses, also known as amorphous alloys, embody a relatively new class of materials that is receiving much interest from the engineering and design communities. Metallic glasses are characterized by their disordered atomic-scale structure in spite of their metallic constituent elements—i.e. whereas conventional metallic materials typically possess a highly ordered atomic structure, metallic glass materials are characterized by their disordered atomic structure. Notably, metallic glasses typically possess a number of useful material properties that can allow them to be implemented as highly effective engineering materials. For example, metallic glasses are generally much harder than conventional metals, and are generally tougher than ceramic materials. They are also relatively corrosion resistant, and, unlike conventional glass, they can have good electrical conductivity. Importantly, metallic glass materials lend themselves to relatively easy processing in certain respects. For example, the forming of metallic glass materials can be compatible with injection molding processes. Thus, for example, metallic glass compositions can be cast into desired shapes.

Nonetheless, the practical implementation of metallic glasses presents certain challenges that limit their viability as engineering materials. In particular, metallic glasses are typically formed by raising a metallic alloy above its melting temperature, and rapidly cooling the melt to solidify it in a way such that its crystallization is avoided, thereby forming the metallic glass. The first metallic glasses required extraordinary cooling rates, e.g. on the order of $10^6$ K/s, and were thereby limited in the thickness with which they could be formed. Indeed, because of this limitation in thickness, metallic glasses were initially limited to applications that involved coatings. Since then, however, particular alloy compositions that are more resistant to crystallization have been developed, which can thereby form metallic glasses at much lower cooling rates, and can therefore be made to be much thicker (e.g. greater than 1 mm). These metallic glass compositions that can be made to be thicker are known as 'bulk metallic glasses' ("BMGs"). As can be appreciated, such BMGs can be better suited for investment molding operations.

In addition to the development of BMGs, 'bulk metallic glass matrix composites' (BMGMCs) have also been developed. BMGMCs are characterized in that they possess the amorphous structure of BMGs, but they also include crystalline phases of material within the matrix of amorphous structure. For example, the crystalline phases can exist in the form of dendrites. The crystalline phase inclusions can impart a host of favorable materials properties on the bulk material. For example, the crystalline phases can allow the material to have enhanced ductility, compared to where the material is entirely constituted of the amorphous structure. BMGs and BMGMCs can be referred to collectively as BMG-based materials. Similarly, metallic glasses, metallic glasses that include crystalline phase inclusions, BMGs, and BMGMCs can be referred to collectively as metallic glass-based materials or MG-based materials.

The potential of metallic glass-based materials continues to be explored, and developments continue to emerge. For example, in U.S. patent application Ser. No. 13/928,109, D. Hofmann et al. disclose the implementation of metallic glass-based materials in macroscale gears. The disclosure of U.S. patent application Ser. No. 13/928,109 is hereby incorporated by reference in its entirety, especially as it pertains to metallic glass-based materials, and their implementation in macroscale gears. Likewise, in U.S. patent application Ser. No. 13/942,932, D. Hofmann et al. disclose the implementation of metallic glass-based materials in macroscale compliant mechanisms. The disclosure of U.S. patent application Ser. No. 13/942,932 is hereby incorporated by reference in its entirety, especially as it pertains to metallic glass-based materials, and their implementation in macroscale compliant mechanisms. Moreover, in U.S. patent application Ser. No. 14/060,478, D. Hofmann et al. disclose techniques for depositing layers of metallic glass-based materials to form objects. The disclosure of U.S. patent application Ser. No. 14/060,478 is hereby incorporated by reference especially as it pertains to metallic glass-based materials, and techniques for depositing them to form objects. Furthermore, in U.S. patent application Ser. No. 14/163,936, D. Hofmann et al., disclose techniques for additively manufacturing objects so that they include metallic glass-based materials. The disclosure of U.S. patent application Ser. No. 14/163,936 is hereby incorporated by reference in its entirety, especially as it pertains to metallic glass-based materials, and additive manufacturing techniques for manufacturing objects so that they include metallic glass-based materials. Additionally, in U.S. patent application Ser. No. 14/177,608, D. Hofmann et al. disclose techniques for fabricating strain wave gears using metallic glass-based materials. The disclosure of U.S. patent application Ser. No. 14/177,608 is hereby incorporated by reference in its entirety, especially as it pertains to metallic glass-based materials, and their implementation in strain wave gears. Moreover, in U.S. patent application Ser. No. 14/178,098, D. Hofmann et al., disclose selectively developing equilibrium inclusions within an object constituted from a metallic glass-based material. The disclosure of U.S. patent application Ser. No. 14/178,098 is hereby incorporated by reference, especially as it pertains to metallic glass-based materials, and the tailored development of equilibrium inclusions within them. Furthermore, in U.S. patent application Ser. No. 14/252,585, D. Hofmann et al. disclose techniques for shaping sheet materials that include metallic glass-based materials, including using localized thermoplastic deformation and using cold working techniques. The disclosure of U.S. patent application Ser. No. 14/252,585 is hereby incorporated by reference in its entirety, especially as it pertains to metallic glass-based materials and techniques for shaping sheet materials that include metallic glass-based materials, including using localized thermoplastic deformation and using cold-working techniques. Additionally, in U.S. patent application Ser. No. 14/259,608, D. Hofmann et al. disclose techniques for fabricating structures including metallic glass-based materials using ultrasonic welding. The disclosure of U.S. patent application Ser. No. 14/259,608 is hereby incorporated by reference in its entirety, especially as it pertains to metallic glass-based materials and techniques for fabricating structures including metallic glass-based materials using ultrasonic welding. Moreover, in U.S. patent application Ser. No. 14/491,618, D. Hofmann et al. disclose techniques for fabricating structures including metallic glass-based materials using low pressure casting. The disclosure of U.S. patent application Ser. No. 14/491,618 is hereby incorporated by reference in its entirety, especially as it pertains to metallic glass-based materials and techniques for fabricating structures including metallic glass-based materials using low pressure casting. Furthermore, in U.S. patent application Ser. No. 14/660,730, Hofmann et al. disclose metallic glass-based fiber metal laminates. The disclosure of U.S. patent application Ser. No. 14/660,730 is hereby incorporated by reference in its entirety, especially as it pertains to metallic glass-based fiber metal laminates. Additionally, in U.S. patent application Ser. No. 14/971,848, A. Kennett et al. disclose techniques for manufacturing gearbox housings made from metallic glass-based materials. The disclosure of U.S. patent application Ser. No. 14/971,848, is hereby incorporated by reference in its entirety, especially as it pertains to the manufacture of metallic glass-based gearbox housings.

Notwithstanding all of these developments, the vast potential of metallic glass-based materials has yet to be fully appreciated. For instance, the suitability of metallic glass-based materials for implementation as flexible members that include integrated tools (e.g. the flexible suspension members microspine assemblies discussed in the '629 patent) has yet to be fully explored. Conventionally, the structures described in the '629 patent have been fabricated from conventional engineering metals like steel, nitinol, and/or polymers (as depicted in FIGS. 1A-1B). However, these structures can greatly benefit in a number of respects from the incorporation of metallic glass-based materials. For instance, metallic glass-based materials can imbue the wheels with improved fatigue characteristics, improved hardness, improved wear-resistance properties, improved flexibility, improved corrosion resistance, improved resilience against harsh environmental conditions, etc. Thus, for instance, the enhanced flexibility of many MG-based materials (e.g. having an elastic limit of up to 2% or more compared with steel which typically has an elastic limit of on the order of 1%) can allow better performance in terrain traversing applications. At the same time, the inherent hardness of many MG-based materials can further provide for improved hook performance; e.g. the hooks may not wear as easily as they interact with rigorous terrain. Metallic glass-based materials can also be readily cast or otherwise thermoplastically formed into any of a variety of complex geometries. Whereas conventionally, the fabrication of these structures involved adjoining various components to achieve the desired geometry, metallic glass-based materials can viably be 'net shape' cast (or 'near net shape' cast) into these structures; this can greatly enhance manufacturing efficiency. Methods for fabricating flexible members with integrated tools that include metallic glass-based materials are now discussed below.

Methods for Implementing Flexible Members Including Integral Tools from Metallic Glass-Based Materials In many embodiments of the invention, flexible members including integral tools are fabricated from metallic glass-based materials. Any suitable manufacturing technique can be utilized to form the flexible member in accordance with embodiments of the invention. For example, in many embodiments, metallic glass-based materials are cold worked to shape them into the desired geometry—e.g. they are shaped at temperatures less than or equal to approximately room temperature (e.g. 72° F.). More broadly stated, cold-working can be said to occur when an MG-based material is shaped at a temperature less than its respective glass transition temperature. Thus for instance, FIGS. 2A-2E illustrate the fabrication of a flexible member including an integrated tool from a metallic glass-based material via cold-forming in accordance with an embodiment of the invention. In particular, FIG. 2A illustrates a metallic glass-based material to be formed into the desired structure. In the illustrated embodiment, the MG-based material is DV1. FIG. 2B illustrates that the metallic glass-based composition has been sliced into a thin sheet characterized by a thickness of 1 mm. FIG. 2C illustrates that the metallic glass-based composition has been further sliced to create an elongated geometry. FIG. 2D illustrates that the end is then bent to an angle greater than approximately 80° to create the desired geometry; more particularly, the bent end defines a hook that is the integrated tool. The inherent fracture toughness of DV1 allows it to accommodate the depicted extreme bending. FIG. 2E illustrates the final geometry of two created structures. Thus, contrary to what may have been previously believed, it is illustrated that it is possible to bend (via cold working) an elongated geometry—made from a MG-based material—to an extreme angle without worrying about compromising the structural integrity of the piece. This is largely a function of the inherent fracture toughness of the respective metallic glass-based material. Accordingly, while cold-forming to this degree may be suitable for certain MG-based materials, it may not be suitable for all MG-based materials. A respective material must have at least a minimum fracture toughness in order to be able to withstand cold-working to this degree. Additionally, a MG-based material's ability to be cold-worked as described may be a function of the thickness of the MG-based material flexible member. Thus, for instance, in many embodiments a flexible member to be cold worked to form the integrated tool is characterized by a thickness of less than 1.5 mm. Cold forming can enable the easy manufacture of this useful geometry.

While cold-working a flexible member to form an integrated tool from a metallic glass-based material has been illustrated, it should be clear that any of a variety of processes can be implemented to form a flexible member including an integrated tool in accordance with embodiments of the invention. For example, in many embodiments, localized thermoplastic deformation processes as disclosed in U.S. patent application Ser. No. 14/252,585 incorporated by reference above are implemented, e.g. the flexible member can be bent when a region of the flexible member is above its respective glass transition temperature to define the hook. In many embodiments, direct casting techniques are utilized; casting can be a particularly efficient manufacturing strategy for the bulk fabrication of the described structures. Any suitable manufacturing technology can be implemented in accordance with embodiments of the invention.

Moreover, note that any suitable MG-based composition can be utilized to form a flexible member having an integrated tool in accordance with embodiments of the invention; embodiments of the invention are not limited to a particular composition. For example, in many instances, the utilized alloy composition is a composition that is based on one of: Ti, Zr, Cu, Ni, Fe, Pd, Pt, Ag, Au, Al, Hf, W, Ti—Zr—Be, Cu—Zr, Zr—Be, Ti—Cu, Zr—Cu—Ni—Al, Ti—Zr—Cu—Be and combinations thereof. In the instant context, the term 'based on' can be understood to mean that the specified element(s) are present in the greatest amount relative to any other present elements. Additionally, within the context of the instant application, the term "MG-based composition" can be understood reference an element, or aggregation of elements, that are capable of forming a metallic glass-based material (e.g. via being exposed to a sufficiently rapid, but viable, cooling rate). While several examples of suitable metallic glass-based materials are listed above, it should be reiterated that any suitable metallic glass-based composition can be incorporated in accordance with embodiments of the invention; for example, any of the metallic glass-based compositions listed in the disclosures cited and incorporated by reference above can be implemented. As alluded to above, in many embodiments, the implemented MG-based composition is based on the manufacturing technique to be applied. For example, where cold working will be used to shape the MG-based composition, a MG-based composition that is capable of forming a MG-based material characterized by a relatively high fracture toughness can be implemented. In a number of embodiments, the MG-based material is characterized by a fracture toughness of greater than approximately 80 MPa·m$^{1/2}$. In several embodiments, the MG-based material is characterized by a fracture toughness of greater than approximately 100 MPa·m$^{1/2}$. In many embodiments, the MG-based composition is implemented in the form of a matrix composite characterized by a particularly high fracture toughness (e.g. greater than approximately 80 MPa·m$^{1/2}$ or approximately 100 MPa·m$^{1/2}$). In a number of embodiments, the MG-based material that is to be formed into a flexible member via cold-forming is characterized by a thickness that is less than approximately three times the thickness of the plastic zone radius of the respective MG-based material. In numerous embodiments, the MG-based material that is to be formed into a flexible member via cold-forming is characterized by a thickness that is less than plastic zone radius of the respective MG-based material. In several embodiments, the MG-based material is characterized by a thickness of less than approximately 1.5 mm. These thicknesses can facilitate the desired formability. In many instances, the particular MG-based composition to be implemented is based on an assessment of the anticipated operating environment for the flexible member. For example, where it desired that the flexible member be relatively less massive, a titanium based MG-based material can be implemented. In many instances, the selection of the MG-based material to be implemented is based on the desire for one of: environmental resilience, toughness, wear resistance, hardness, density, machinability, and combinations thereof. In numerous embodiments, the MG-based material to be implemented is based on the desire to have relatively high resistance to wear (which can be correlated with hardness) and relatively high flexibility (which can be correlated with elastic strain limit). In many embodiments, the hardness of the MG-based material to be implemented is characterized by a value greater than approximately 50 Rc according to the Rockwell scale. In a number of embodiments, the MG-based material to be implemented has an elastic limit greater than approximately 1%. For reference, Tables 1-6 list materials data that can be relied on in selecting a metallic glass-based composition to be implemented. Any suitable MG-based material listed in the tables below can be implemented in accordance with various embodiments of the invention.

TABLE 1

Material Properties of MG-Based Materials relative to Heritage Engineering Materials

| Material | Density (g/cc) | Stiffness, E (GPa) | Tensile Yield (MPa) | Tensile UTS (MPa) | Elastic Limit (%) | Specific Strength | Hardness (HRC) |
|---|---|---|---|---|---|---|---|
| SS 15500 H1024 | 7.8 | 200 | 1140 | 1170 | <1 | 146 | 36 |
| Ti—6Al—4V STA | 4.4 | 114 | 965 | 1035 | <1 | 219 | 41 |
| Ti—6Al—6V—4Sn STA | 4.5 | 112 | 1035 | 1100 | <1 | 230 | 42 |
| Nitronic 60 CW | 7.6 | 179 | 1241 | 1379 | <1 | 163 | 40 |
| Vascomax C300 | 8.0 | 190 | 1897 | 1966 | <1 | 237 | 50 |
| Zr-BMG | 6.1 | 97 | 1737 | 1737 | >1.8 | 285 | 60 |
| Ti-BMGMC | 5.2 | 94 | 1362 | 1429 | >1.4 | 262 | 51 |
| Zr-BMGMC | 5.8 | 75 | 1096 | 1210 | >1.4 | 189 | 48 |

TABLE 2

Material Properties of Select MG-Based Materials as a function of Composition

| name | atomic % | weight % | BMG (%) | bcc (%) | $\rho$ (g/cm$^3$) | $\sigma_y$ (MPa) | $\sigma_{max}$ (MPa) | $\varepsilon_y$ (%) | E (GPa) | $T_x$ (K) |
|---|---|---|---|---|---|---|---|---|---|---|
| DV2 | Ti$_{44}$Zr$_{20}$V$_{12}$Cu$_5$Be$_{15}$ | Ti$_{41.9}$Zr$_{35.3}$V$_{12.1}$Cu$_{6.3}$Be$_{3.4}$ | 70 | 30 | 5.13 | 1597 | 1614 | 2.1 | 94.5 | 956 |
| DV1 | Ti$_{48}$Zr$_{20}$V$_{12}$Cu$_5$Be$_{15}$ | Ti$_{44.3}$Zr$_{35.2}$V$_{11.8}$Cu$_{6.1}$Be$_{2.6}$ | 53 | 47 | 5.15 | 1362 | 1429 | 2.3 | 9.2 | 955 |
| DV3 | Ti$_{56}$Zr$_{18}$V$_{10}$Cu$_4$Be$_{12}$ | Ti$_{51.6}$Zr$_{31.6}$V$_{9.8}$Cu$_{4.9}$Be$_{2.1}$ | 46 | 54 | 5.08 | 1308 | 1309 | 2.2 | 84.0 | 951 |
| DV4 | Ti$_{62}$Zr$_{15}$V$_{10}$Cu$_4$Be$_9$ | Ti$_{57.3}$Zr$_{26.4}$V$_{9.8}$Cu$_{4.9}$Be$_{1.6}$ | 40 | 60 | 5.03 | 1086 | 1089 | 2.1 | 83.7 | 940 |
| DVAl1 | Ti$_{60}$Zr$_{16}$V$_9$Cu$_3$Al$_3$Be$_9$ | Ti$_{55.8}$Zr$_{38.4}$V$_{8.9}$Cu$_{3.7}$Al$_{1.6}$Be$_{1.5}$ | 31 | 69 | 4.97 | 1166 | 1189 | 2.0 | 84.2 | 901 |
| DVAl2 | Ti$_{67}$Zr$_{11}$V$_{10}$Cu$_5$Al$_2$Be$_2$ | Ti$_{54.2}$Zr$_{39.5}$V$_{9.5}$Cu$_{6.2}$Al$_1$Be$_{0.5}$ | 20 | 80 | 4.97 | 990 | 1000 | 2.0 | 78.7 | 998 |
| Ti-6-4a | Ti$_{86.1}$Al$_{10.3}$V$_{3.6}$ | Ti$_{90}$Al$_6$V$_4$ (Grade 5 Annealed) | na | na | 4.43 | 754 | 882 | 1.0 | 113.8 | 1877 |
| Ti-6-4s | Ti$_{86.1}$Al$_{10.3}$V$_{3.5}$ [Ref] | Ti$_{98}$Al$_6$V$_4$ (Grade 5 STA) | na | na | 4.43 | 1100 | 1170 | -1 | 114.0 | 1877 |
| CP-Ti | Ti$_{100}$ | Ti$_{100}$ (Grade 2) | na | na | 4.51 | 380 | 409 | 0.7 | 105.0 | -1930 |

TABLE 3

Material Properties of Select MG-Based Materials as a function of Composition

| Alloy | $\sigma_{max}$ (MPa) | $E_{tot}$ (%) | $\sigma_y$ (MPa) | $\varepsilon_y$ (%) | E (GPa) | $\rho$ (g/cm$^3$) | G (GPa) | CIT (J) | RoA (%) | $\upsilon$ |
|---|---|---|---|---|---|---|---|---|---|---|
| Zr$_{36.6}$Ti$_{31.4}$Nb$_7$Cu$_{5.9}$Be$_{19.1}$ (DH1) | 1512 | 9.58 | 1474 | 1.98 | 84.3 | 5.6 | 30.7 | 26 | 44 | 0.371 |
| Zr$_{38.3}$Ti$_{32.9}$Nb$_{7.3}$Cu$_{6.2}$Be$_{15.3}$ (DH2) | 1411 | 10.0 | 1567 | 1.92 | 79.2 | 5.7 | 28.8 | 40 | 50 | 0.373 |
| Zr$_{39.6}$Ti$_{33.9}$Nb$_{7.6}$Cu$_{6.4}$Be$_{12.5}$ (DH3) | 1210 | 13.10 | 1096 | 1.62 | 75.3 | 5.8 | 27.3 | 45 | 46 | 0.376 |
| Zr$_{41.2}$Ti$_{13.8}$Cu$_{12.5}$Ni$_{10}$Be$_{22.5}$ (Vitreloy 1) | 1737 | 1.98 | — | — | 97.2 | 6.1 | 35.9 | 8 | 0 | 0.355 |
| Zr$_{56.2}$Ti$_{13.8}$Nb$_{5.0}$Cu$_{6.9}$Ni$_{5.6}$Be$_{12.5}$ (LM2) | 1302 | 5.49 | 1046 | 1.48 | 78.8 | 6.2 | 28.6 | 24 | 22 | 0.375 |

TABLE 4

Material Properties as a Function of Composition and Structure, where A is Amorphous, X, is Crystalline, and C is Composite

| | A/X/C | 2.0Hv | E (GPa) |
|---|---|---|---|
| (CuZr$_{42}$Al$_7$Be$_{10}$)Nb$_3$ | A | 626.5 | 108.5 |
| (CuZr$_{46}$Al$_5$Y$_2$)Nb$_3$ | A | 407.4 | 76.9 |
| (CuZrAl$_7$Be$_5$)Nb$_3$ | A | 544.4 | 97.8 |
| (CuZrAl$_7$Be$_7$)Nb$_3$ | A | 523.9 | 102.0 |
| Cu$_{40}$Zr$_{40}$Al$_{10}$Be$_{10}$ | A | 604.3 | 114.2 |
| Cu$_{41}$Zr$_{40}$Al$_7$Be$_7$Co$_5$ | C | 589.9 | 103.5 |
| Cu$_{42}$Zr$_{41}$Al$_7$Be$_7$Co$_3$ | A | 532.4 | 101.3 |
| Cu$_{47.5}$Zr$_{48}$Al$_4$Co$_{0.5}$ | X | 381.9 | 79.6 |
| Cu$_{47}$Zr$_{46}$Al$_5$Y$_2$ | A | 409.8 | 75.3 |
| Cu$_{50}$Zr$_{50}$ | X | 325.9 | 81.3 |
| CuZr$_{41}$Al$_7$Be$_7$Cr$_3$ | A | 575.1 | 106.5 |
| CuZrAl$_5$Be$_5$Y$_2$ | A | 511.1 | 88.5 |
| CuZrAl$_5$Ni$_3$Be$_4$ | A | 504.3 | 95.5 |
| CuZrAl$_7$ | X | 510.5 | 101.4 |
| CuZrAl$_7$Ag$_7$ | C | 496.1 | 90.6 |
| CuZrAl$_7$Ni$_5$ | X | 570.0 | 99.2 |
| Ni$_{40}$Zr$_{28.5}$Ti$_{16.5}$Be$_{15}$ | C | 715.2 | 128.4 |
| Ni$_{40}$Zr$_{28.5}$Ti$_{16.5}$Cu$_{15}$Al$_{10}$ | X | 627.2 | 99.3 |
| Ni$_{40}$Zr$_{28.5}$Ti$_{16.5}$Cu$_{15}$Be$_{10}$ | C | 668.2 | 112.0 |
| Ni$_{56}$Zr$_{17}$Ti$_{13}$Si$_2$Sn$_3$Be$_9$ | X | 562.5 | 141.1 |
| Ni$_{56}$Zr$_{18}$Ti$_{14}$Si$_2$Sn$_3$Be$_6$ | X | 637.3 | 139.4 |
| Ti$_{33.18}$Zr$_{30.51}$Ni$_{5.33}$Be$_{22.88}$Cu$_{8.1}$ | A | 486.1 | 96.9 |
| Ti$_{40}$Zr$_{25}$Be$_{30}$Cr$_5$ | A | 465.4 | 97.5 |
| Ti$_{40}$Zr$_{25}$Ni$_8$Cu$_9$Be$_{18}$ | A | 544.4 | 101.1 |
| Ti$_{45}$Zr$_{16}$Ni$_9$Cu$_{10}$Be$_{20}$ | A | 523.1 | 104.2 |
| Vit 1 | A | 530.4 | 95.2 |
| Vit 105 (Zr$_{52.5}$Ti$_5$Cu$_{17.9}$Ni$_{14.6}$Al$_{10}$) | A | 474.4 | 88.5 |
| Vit 106 | A | 439.7 | 83.3 |
| Zr$_{55}$Cu$_{30}$Al$_{10}$Ni$_5$ | A | 520.8 | 87.2 |
| Zr$_{65}$Cu$_{17.5}$Al$_{7.5}$Ni$_{10}$ | A | 463.3 | 116.9 |
| DH1 | C | 391.1 | 84.7 |
| GHDT (Ti$_{30}$Zr$_{35}$Cu$_{8.2}$Be$_{26.8}$) | A | 461.8 | 90.5 |

TABLE 5

Fatigue Characteristics as a Function of Composition

| Material | Fracture Strength (MPa) | Geometry (mm) | Loading mode | Frequency (Hz) | R-ratio | Fatigue Limit (MPa) | Fatigue ratio |
|---|---|---|---|---|---|---|---|
| $Zr_{56.2}Cu_{6.9}Ni_{5.6}Ti_{13.8}Nb_{5.0}Be_{12.5}$ Composites | 1480 | 3 × 3 × 30 | 4PB | 25 | 0.1 | ~296 | 0.200 |
| $Zr_{41.2}Cu_{12.5}Ni_{10}Ti_{13.8}Be_{22.5}$ | 1900 | 3 × 3 × 50 | 4PB | 25 | 0.1 | ~152 | 0.080 |
| $Zr_{41.2}Cu_{12.5}Ni_{10}Ti_{13.8}Be_{22.5}$ | 1900 | 2 × 2 × 60 | 3PB | 10 | 0.1 | 768 | 0.404 |
| $Zr_{41.2}Cu_{12.5}Ni_{10}Ti_{13.8}Be_{22.5}$ | 1900 | 2 × 2 × 60 | 3PB | 10 | 0.1 | 359 | 0.189 |
| $Zr_{44}Ti_{11}Ni_{10}Cu_{10}Be_{25}$ | 1900 | 2.3 × 2.0 × 85 | 4PB | 5-20 | 0.3 | 550 | 0.289 |
| $Zr_{44}Ti_{11}Ni_{10}Cu_{10}Be_{25}$ | 1900 | 2.3 × 2.0 × 85 | 4PB | 5-20 | 0.3 | 390 | 0.205 |
| $Zr_{52.5}Cu_{17.9}Al_{10}Ni_{14.6}Ti_5$ | 1700 | 3.5 × 3.5 × 30 | 4PB | 10 | 0.1 | 850 | 0.500 |
| $(Zr_{58}Ni_{13.6}Cu_{18}Al_{10.4})_{99}Nb_1$ | 1700 | 2 × 2 × 25 | 4PB | 10 | 0.1 | 559 | 0.329 |
| $Zr_{55}Cu_{30}Ni_5Al_{10}$ | 1560 | 2 × 20 × 50 | Plate bend | 40 | 0.1 | 410 | 0.263 |

TABLE 6

Fatigue Characteristics as a Function of Composition

| Material | Fracture Strength (MPa) | Geometry (mm) | Loading mode | Frequency (Hz) | R-ratio | Fatigue Limit (MPa) | Fatigue ratio |
|---|---|---|---|---|---|---|---|
| $Zr_{56.2}Cu_{6.9}Ni_{5.6}Ti_{13.8}Nb_{5.0}Be_{12.5}$ Composites | 1480 | ⌀2.98 | TT | 10 | 0.1 | 239 | 0.161 |
| $Zr_{55}Cu_{30}Al_{10}Ni_5$ Nano | 1700 | 2 × 4 × 70 | TT | 10 | 0.1 | ~340 | 0.200 |
| $Zr_{41.2}Cu_{12.5}Ni_{10}Ti_{13.8}Be_{22.5}$ | 1850 | ⌀2.98 | TT | 10 | 0.1 | 703 | 0.380 |
| $Zr_{41.2}Cu_{12.5}Ni_{10}Ti_{13.8}Be_{22.5}$ | 1850 | ⌀2.98 | TT | 10 | 0.1 | 615 | 0.332 |
| $Zr_{41.2}Cu_{12.5}Ni_{10}Ti_{13.8}Be_{22.5}$ | 1850 | ⌀2.98 | TT | 10 | 0.1 | 567 | 0.306 |
| $Zr_{41.2}Cu_{12.5}Ni_{10}Ti_{13.8}Be_{22.5}$ | 1900 | — | CC | 5 | 0.1 | ~1050 | 0.553 |
| $Zr_{41.2}Cu_{12.5}Ni_{10}Ti_{13.8}Be_{22.5}$ | 1900 | — | TC | 5 | ~1 | ~150 | 0.079 |
| $Zr_{50}Cu_{40}Al_{10}$ | 1821 | ⌀2.98 | TT | 10 | 0.1 | 752 | 0.413 |
| $Zr_{50}Cu_{30}Al_{10}Ni_{10}$ | 1900 | ⌀2.98 | TT | 10 | 0.1 | 865 | 0.455 |
| $Zr_{50}Cu_{30}Al_{10}Pd_3$ | 1899 | ⌀2.98 | TT | 10 | 0.1 | 983 | 0.518 |
| $Zr_{50}Cu_{30}Al_{10}Pd_3$ | 1899 | ⌀2.98 | TT | 10 | 0.1 | ~900 | 0.474 |
| $Zr_{52.5}Cu_{17.9}Al_{10}Ni_{14.6}Ti_5$ | 1660 | 6 × 3 × 15 | TT | 1 | 0.1 | — | — |
| $Zr_{52.5}Cu_{17.9}Al_{10}Ni_{14.6}Ti_5$ | 1700 | ⌀2.98 | TT | 10 | 0.1 | 907 | 0.534 |
| $Zr_{59}Cu_{20}Al_{10}Ni_8Ti_3$ | 1580 | 6 × 3 × 1.5 | TT | 1 | 0.1 | — | — |
| $Zr_{65}Cu_{15}Al_{10}Ni_{10}$ | 1300 | 3 × 4 × 16 | TT | 20 | 0.1 | ~280 | 0.215 |
| $Zr_{55}Cu_{30}Al_{10}Ni_5$ | 1560 | 1 × 2 × 5 | TT | 0.13 | 0.5 | — | — |

Figure 3:
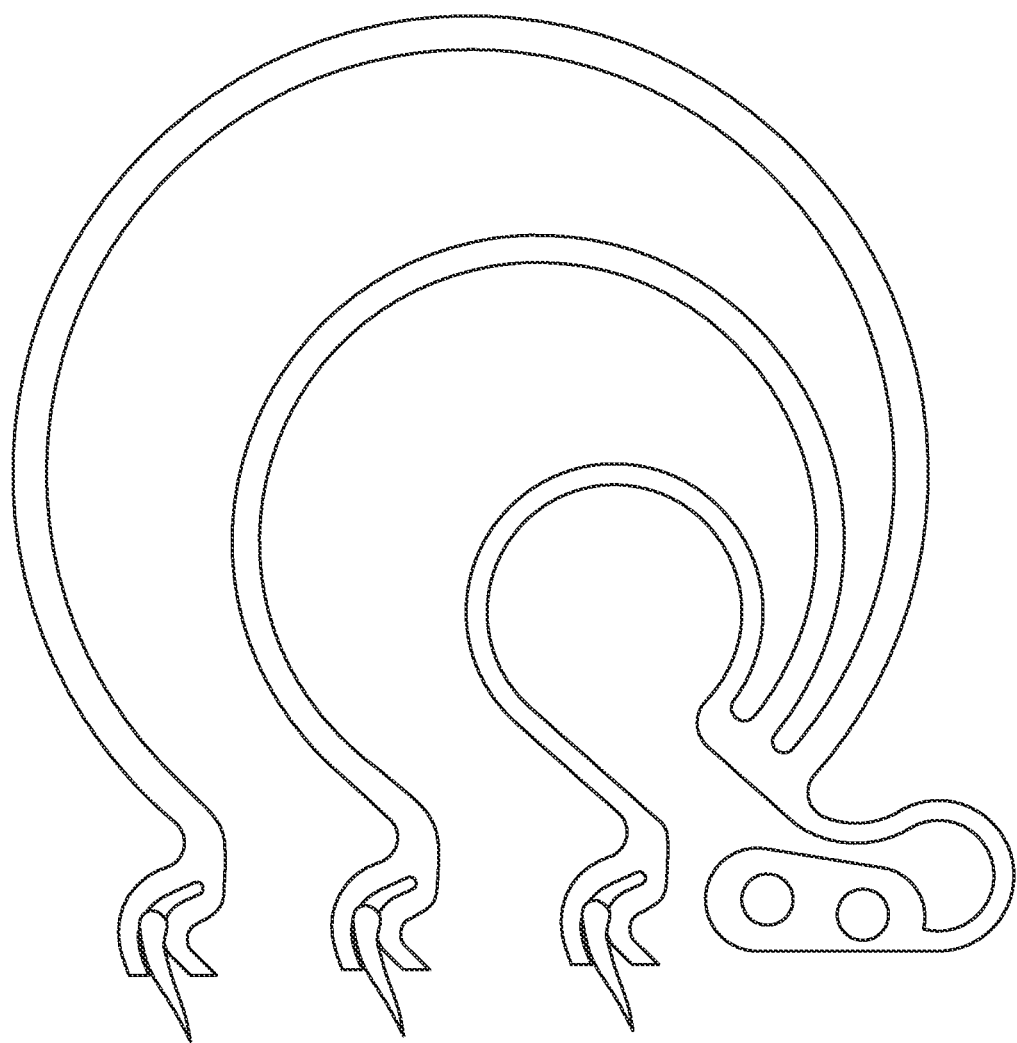
FIG. 3 illustrates an alternative geometry for a flexible member including a plurality of integrated tools made from a metallic glass-based material that can be implemented in accordance with certain embodiments of the invention.

Furthermore, although a particular geometry for a flexible member with an integrated tool is illustrated and described with respect to FIGS. 2A-2E, it should be clear that any suitable geometry for a flexible member including an integrated tool can be incorporated in accordance with embodiments of the invention. For example, in many embodiments, a flexible member includes a plurality of extensions and a plurality of integrated tools. Thus, for instance, FIG. 3 illustrates a geometry for a flexible member including a plurality of extensions with a plurality of integrated tools in accordance with certain embodiments of the invention. As can be appreciated from the discussion above, any suitable manufacturing techniques can be used to implement the depicted geometry. For example, the depicted geometry could be cast from a MG-based composition in accordance with embodiments of the invention.

Figure 4:
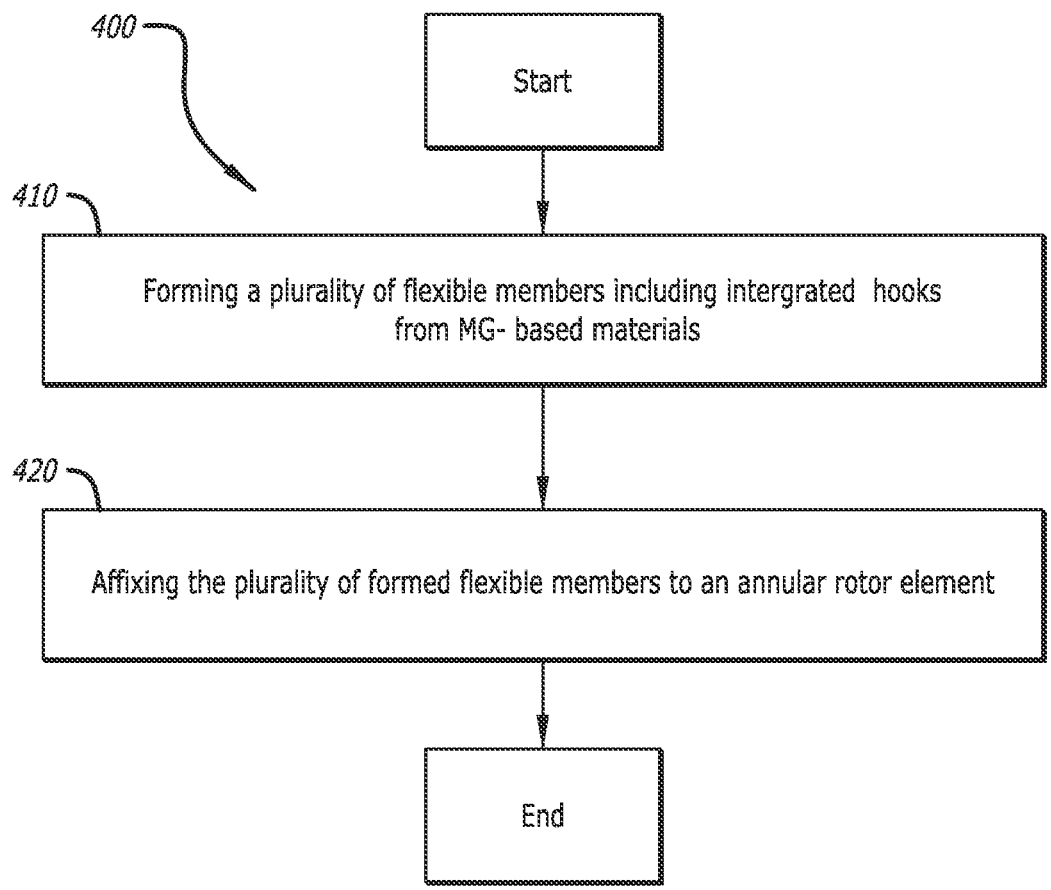
FIG. 4 illustrates a process for implementing a structure including an annular rotor element and a plurality of flexible members including integrated tools made from metallic glass-based materials in accordance with certain embodiments of the invention.
Figure 5A:
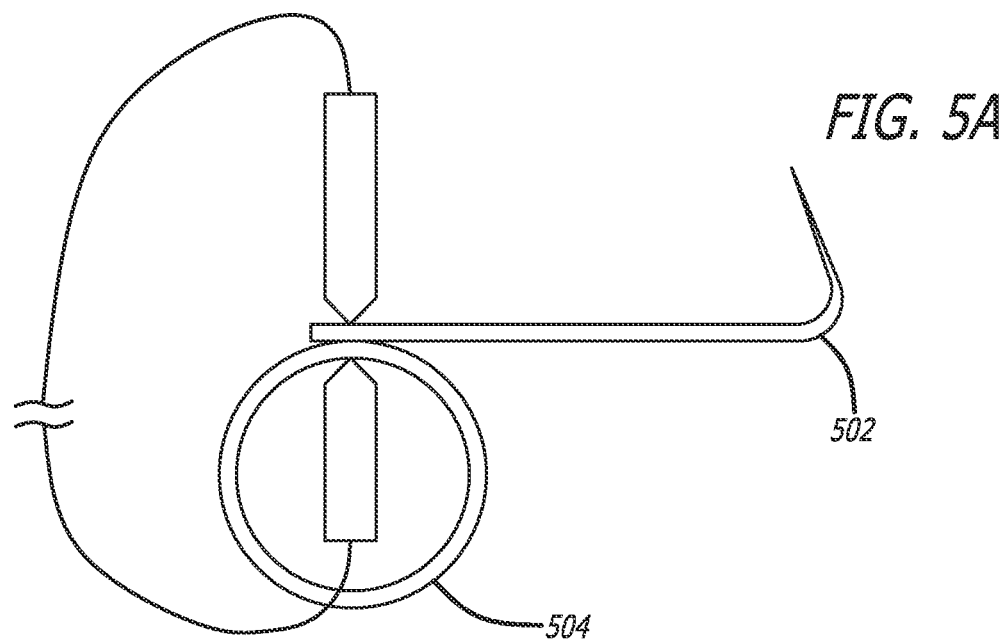
FIGS. 5A-5B illustrate the incorporation of flexible members including integrated tools made from metallic glass-based materials with an annular rotor element in accordance with certain embodiments of the invention.
Figure 5B:
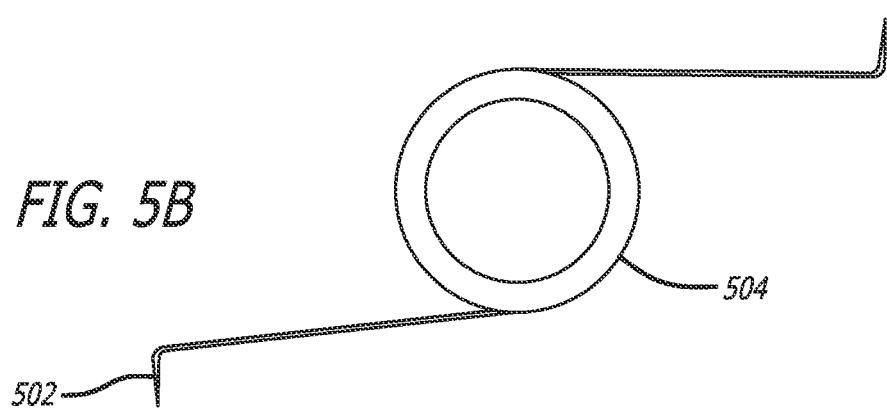
Figure 6A:
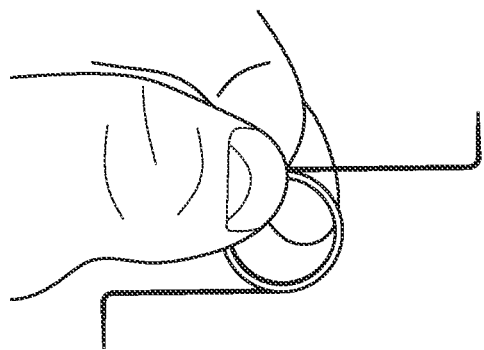
FIGS. 6A-6D illustrate the elasticity of flexible members made from metallic glass-based materials in accordance with certain embodiments of the invention.
Figure 6B:
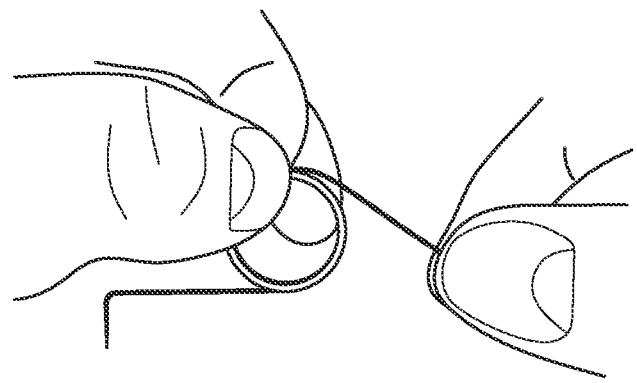
Figure 6C:
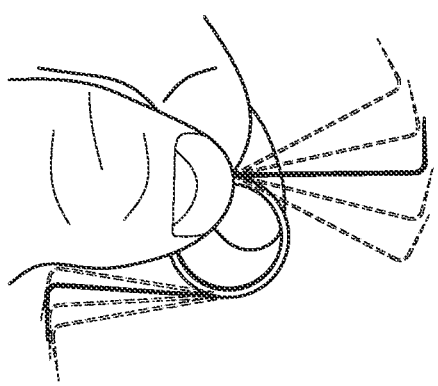
Figure 6D:
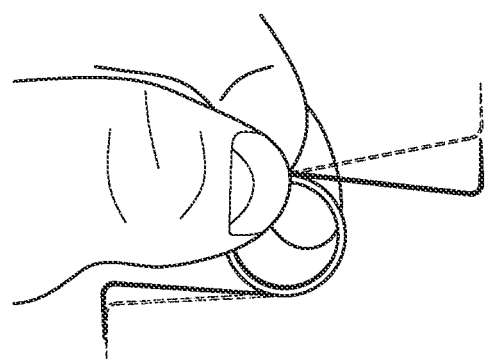

In many embodiments, the flexible members described above are incorporated within the context of a terrain traversing vehicle as disclosed in the terrain traversing devices disclosed in the '629 application. Thus, for example, FIG. 4 illustrates a process for implementing a wheel including microhooks that can be incorporated within a terrain traversing device as disclosed in the '629 patent. In particular, FIG. 4 illustrates that the process 400 includes forming 410 a plurality of flexible members that include integrated hooks from metallic glass-based materials. As before, any suitable metallic glass-based material can be incorporated in accordance with embodiments of the invention, including any material referenced above. Additionally, any suitable manufacturing technique can be used to form the flexible members from the metallic glass-based materials, e.g. cold forming or direct casting. The method 400 further includes affixing 420 the plurality of formed flexible members to an annular rotor element. Any suitable affixing technique can be implemented in accordance with embodiments of the invention. For example, in many embodiments, the flexible member is welded to the annular rotor element. In a number of embodiments, a rapid capacitive discharge technique is utilized to affix the flexible member to the annular rotor element. FIGS. 5A-5B schematically illustrate using a rapid capacitive discharge technique to affix the flexible member to an annular rotor element in accordance with certain embodiments of the invention. In particular, FIG. 5A diagrams using rapid capacitive discharge to affix a flexible member 502 to an annular rotor element 504 in accordance with an embodiment of the invention. FIG. 5B illustrates an annular rotor element including a plurality of flexible members in accordance with an embodiment of the invention.

Notably, metallic glass-based materials are often characterized by their high elastic limits. For example, whereas conventional metals have elastic limits on the order of 1%, metallic glass-based materials can have elastic limits as high as 2% or more. This high elasticity can allow them to be viably implemented within the terrain traversing devices disclosed in the '629 patent. FIGS. 6A-6D visually illustrate the flexibility that flexible members made from metallic glass-based materials can be made to possess.

Figure 7A:
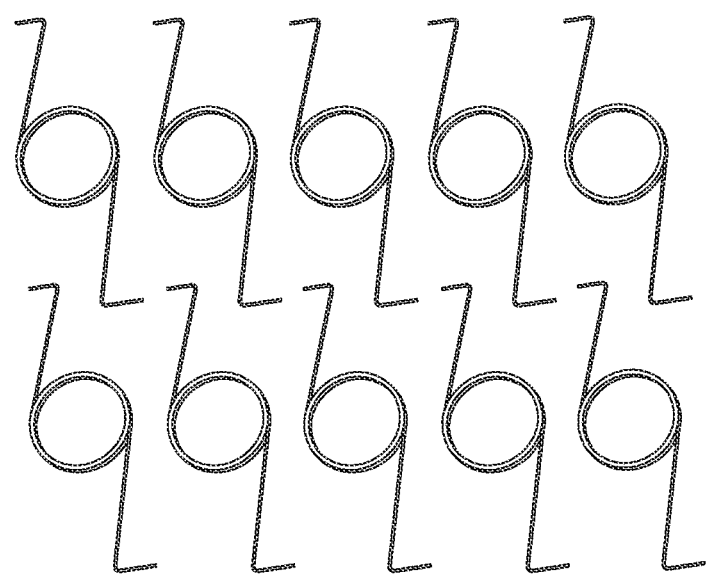
FIGS. 7A-7B illustrate the manufacture of a wheel assembly incorporating a plurality of flexible members including integrated tools made from metallic glass-based materials in accordance with certain embodiments of the invention.
Figure 7B:
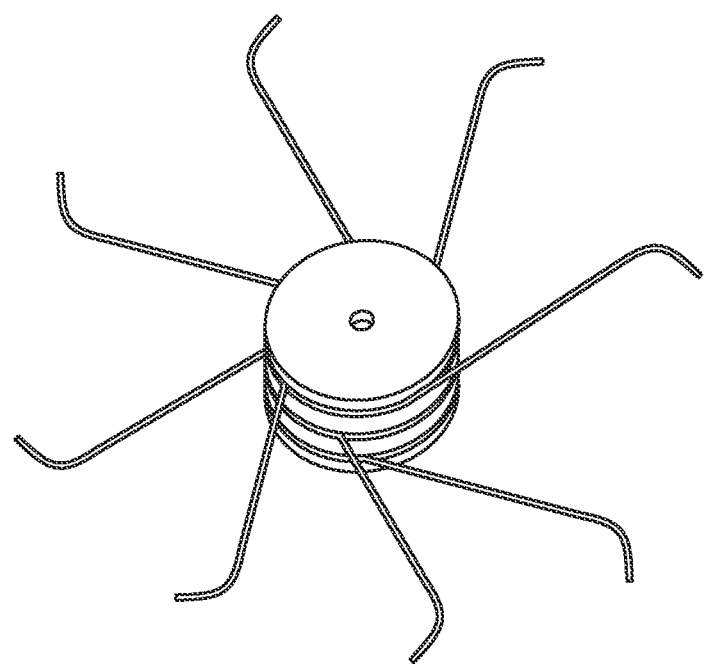

FIGS. 7A-7B illustrate the formation of a wheel including a plurality flexible members with integrated hooks made from metallic glass-based materials in accordance with embodiments of the invention. In particular, FIG. 7A illustrates a plurality of annular rotor elements including a plurality of flexible members made from metallic glass-based materials. FIG. 7B illustrates an assembled wheel incorporated the plurality of annular rotor elements and associated flexible members. In particular, the annular rotor elements can be adjoined such that flexible members are evenly distributed around the adjoined annular rotor elements such that the assembly can operate as a wheel.

Figure 8A:
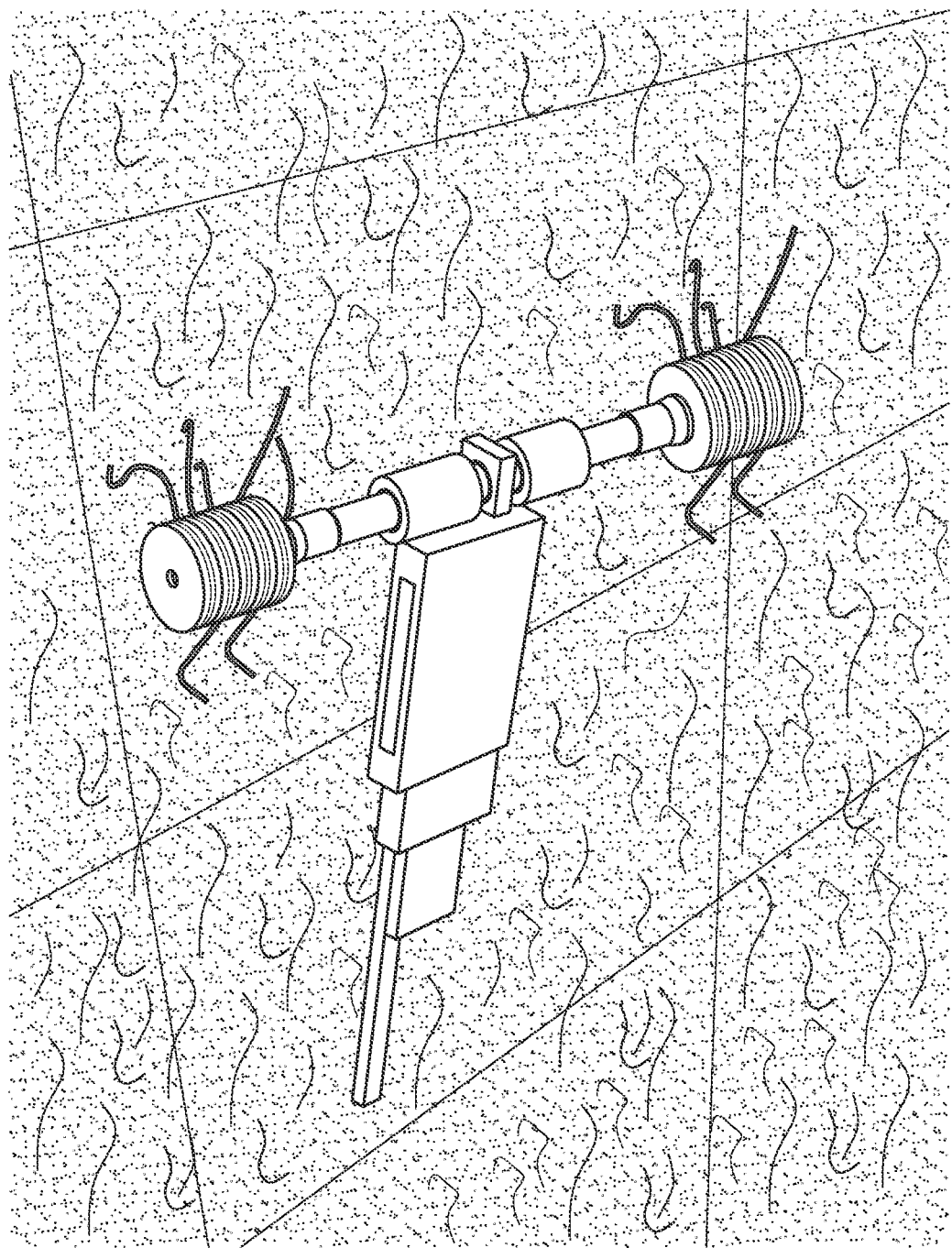
FIGS. 8A-8D illustrates a terrain traversing vehicle incorporating wheel assemblies including flexible members that include integrated tools made from metallic glass-based materials in accordance with certain embodiments of the invention.
Figure 8B:
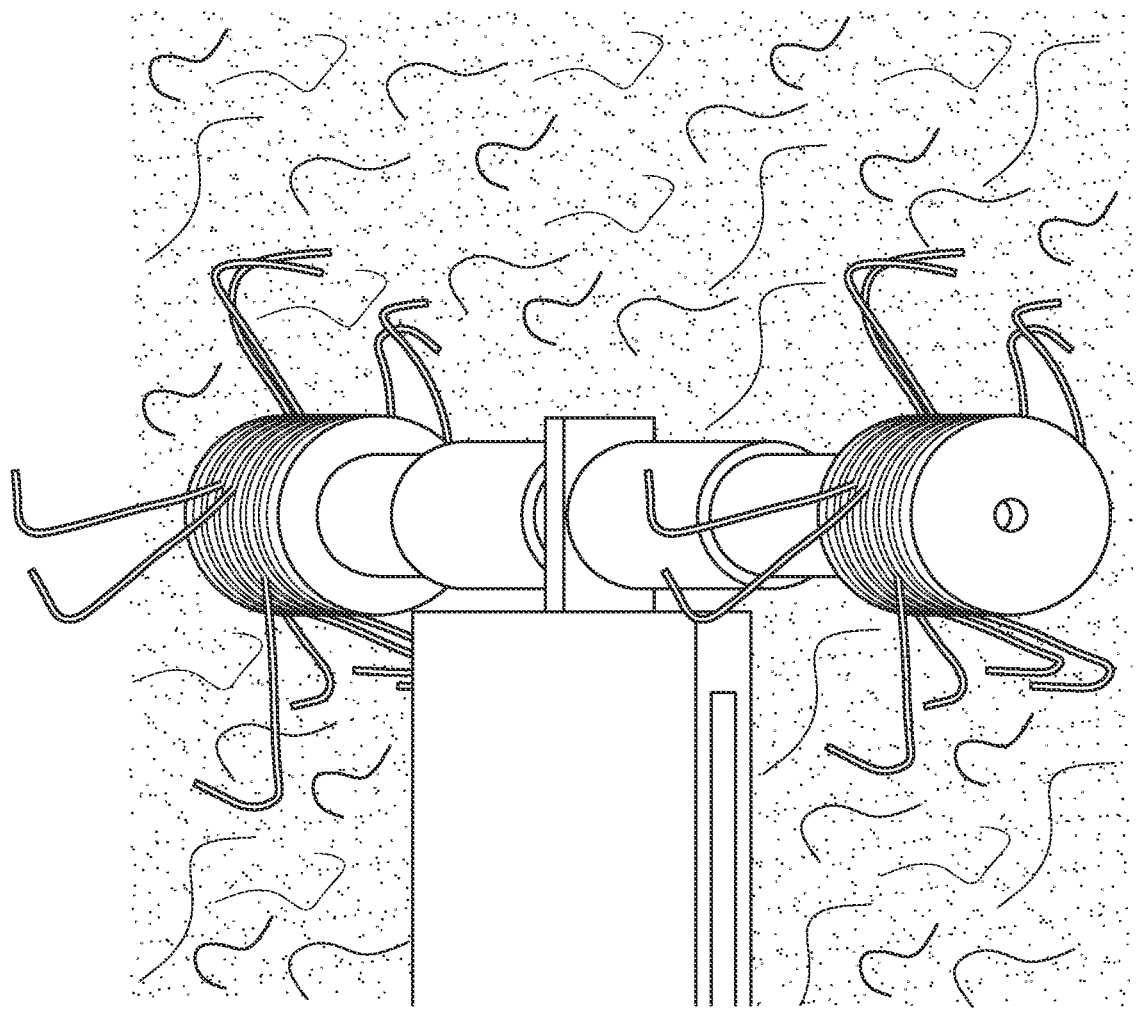
Figure 8C:
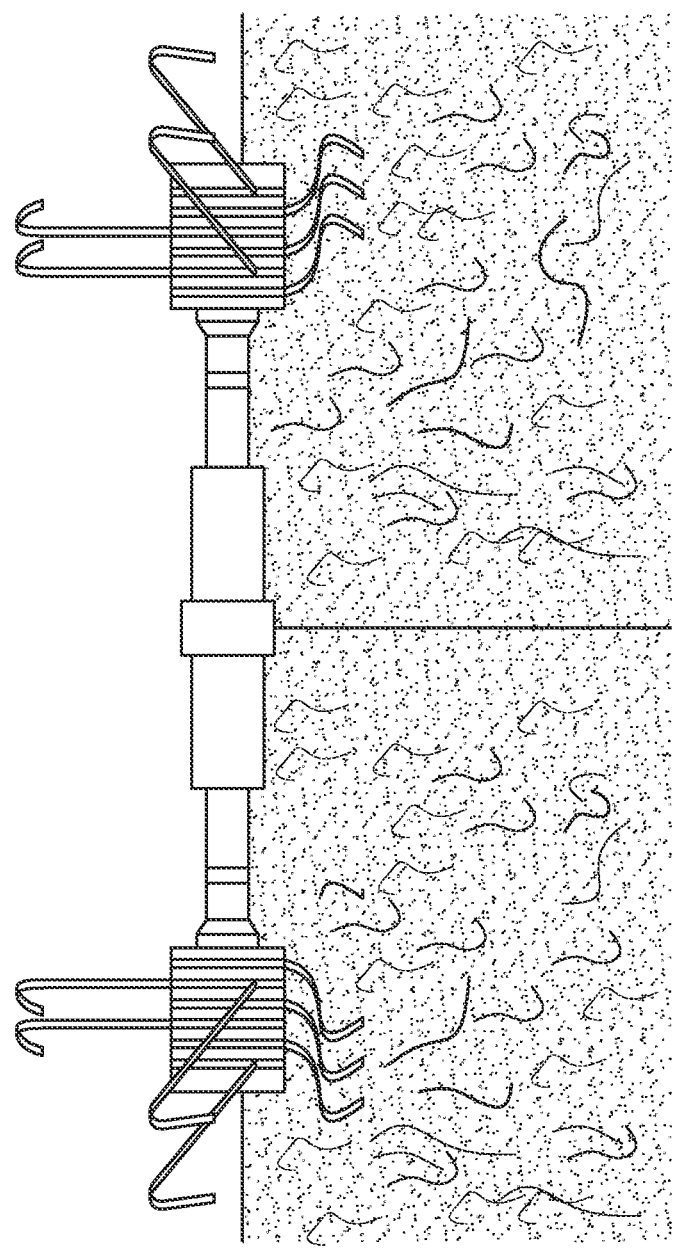
Figure 8D:
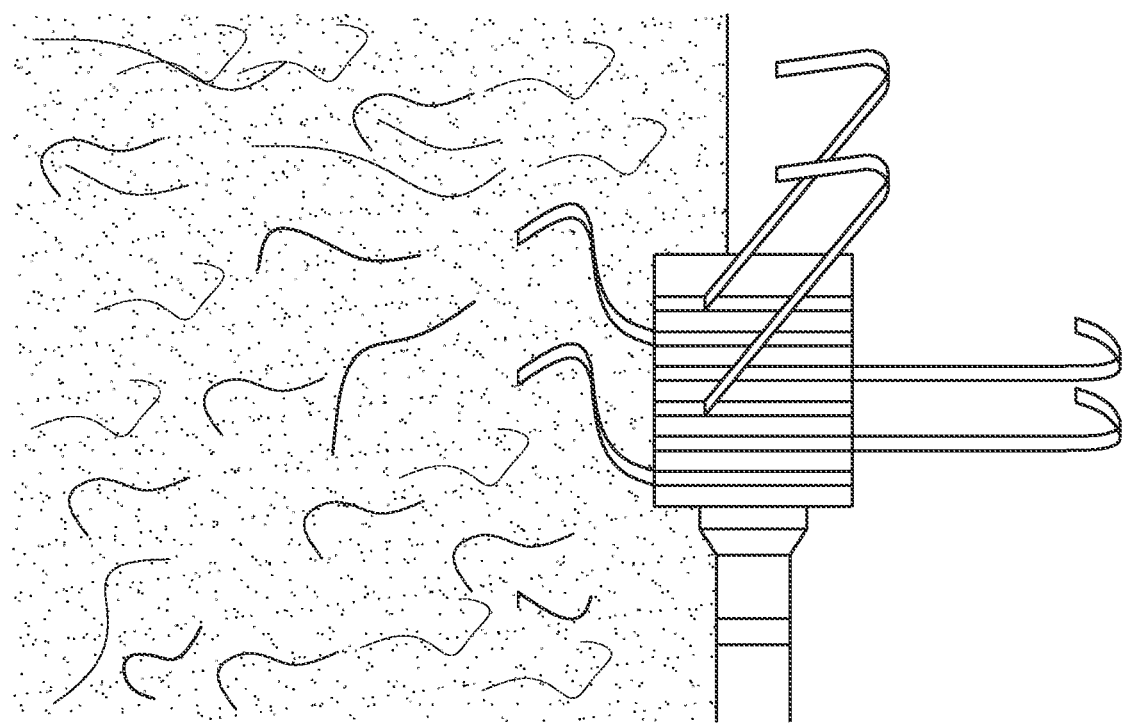

FIGS. 8A-8D illustrates a terrain traversing device that incorporates wheels including flexible members with integrated hooks made from metallic glass-based materials in accordance with embodiments of the invention. In particular, FIG. 8A illustrates an isometric view of the device; FIG. 8B illustrates a view looking down on the device; FIG. 8C illustrates a side-view of the device; and FIG. 8D illustrates a close up of the wheel assembly. Notably, the flexible members and integrated hooks made from MG-based materials were sufficiently structurally integral to allow the device to crawl vertically up a cinder block.

As can be inferred from the above discussion, the above-mentioned concepts can be implemented in a variety of arrangements in accordance with embodiments of the invention. For example, while a hook has been given as the example of an integrated tool, any suitable integrated tool can be implemented in accordance with embodiments of the invention. For instance, any implement configured to facilitate mobility or grip/engage a surface can be implemented. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method of forming a flexible member including an integrated tool, comprising:
   forming a metallic glass-based material into a plurality of elongated flexible members each having a first end and a second end and formed of a metallic glass-based material having a thickness of less than approximately three times the size of a plastic zone radius of the metallic glass-based material and having an elastic limit of at least 1.0%; and
   deforming the elongated flexible member to define at least one hook at a first end of the elongated flexible member such that the elongated flexible member and the hook comprise a unitary body, wherein the temperature of the metallic glass-based material during deformation is lower than its respective crystallization temperature.

2. The method of claim 1, further comprising:
   attaching the second end of a plurality of elongated flexible members to at least one rotor element, such that each elongated flexible member is configured to at least partially wrap about the at least one rotor element during operation; and
   wherein the plurality of elongated flexible members are distributed around the at least one rotor element such that the plurality of elongated flexible members collectively form an outer wheel of integrated tools about the at least one rotor element.

3. The method of claim 1, wherein the metallic glass-based material is a metallic glass matrix composite material.

4. The method of claim 1, wherein the metallic glass-based material is characterized by a fracture toughness of greater than approximately 80 MPa·m$^{1/2}$.

5. The method of claim 1, wherein the metallic glass-based material is fully amorphous.

6. The method of claim 1, wherein the metallic glass-based material is characterized in that it has an elastic limit of greater than approximately 1.5%.

7. The method of claim 1, wherein the metallic glass-based material is characterized in that it has an elastic limit of greater than approximately 2%.

8. The method of claim 1, wherein the elongated flexible member is characterized by a thickness of less than approximately 1.5 mm.

9. The method of claim 1, wherein each elongated flexible member defines a plurality of elongated extensions including a plurality of integrated tools disposed at one end of the respective elongated extensions.

10. The method of claim 1, wherein the hook is defined by an angle of greater than approximately 80° relative to the remainder of the flexible member.

11. The method of claim 1, wherein forming the metallic glass-based material into an elongated flexible member comprises shearing a portion of metallic glass-based material from a sheet of the metallic glass-based material.

12. The method of claim 1, wherein the thickness of the elongated flexible member is less than approximately three times the size of the plastic zone radius of the metallic glass-based material.

13. The method of claim 1, wherein deforming the elongated flexible member comprises heating the elongate flexible member and bending at least the first end thereof along the length thereof, wherein the temperature of the metallic-glass based material is around its respective glass transition temperature.

14. The method of claim 1, wherein the temperature of the metallic-glass based material during deforming is below its respective glass transition temperature.

15. A method of forming a terrain traversing device comprising:
   forming a metallic glass-based material into a plurality of elongated flexible members each having a first end and a second end and formed of a metallic glass-based material having a thickness of less than approximately three times the size of a plastic zone radius of the metallic glass-based material and having an elastic limit of at least 1.0%;
   deforming the elongated flexible member to define at least one hook at a first end of the elongated flexible member such that the elongated flexible member and the hook comprise a unitary body, wherein the temperature of the metallic glass-based material during deformation is lower than its respective crystallization temperature;
   attaching the second end of a plurality of elongated flexible members to at least one rotor element, such that each elongated flexible member is configured to at least partially wrap about the at least one rotor element during operation; and
   wherein the plurality of elongated flexible members are distributed around the at least one rotor element such that the plurality of elongated flexible members collectively form an outer wheel of integrated tools about the at least one rotor element.

\* \* \* \* \*